US010766782B2

(12) United States Patent
Kisielewski et al.

(10) Patent No.: US 10,766,782 B2
(45) Date of Patent: Sep. 8, 2020

(54) PRODUCTION OF CRYSTALLINE SODIUM BICARBONATE

(71) Applicant: Solvay SA, Brussels (BE)

(72) Inventors: James C. Kisielewski, Green River, WY (US); David M. Hansen, Green River, WY (US); Keith O. Hayes, Rock Springs, WY (US); Mayra Muci-Castaneda, Chicago, IL (US); Alain Vandendoren, Wezembeek-Oppem (BE)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 15/761,896

(22) PCT Filed: Sep. 22, 2016

(86) PCT No.: PCT/US2016/053080
§ 371 (c)(1),
(2) Date: Mar. 21, 2018

(87) PCT Pub. No.: WO2017/053549
PCT Pub. Date: Mar. 30, 2017

(65) Prior Publication Data
US 2018/0230018 A1    Aug. 16, 2018

Related U.S. Application Data

(60) Provisional application No. 62/222,769, filed on Sep. 23, 2015.

(51) Int. Cl.
*C01D 7/40*    (2006.01)
*C01D 7/10*    (2006.01)
*C01D 7/24*    (2006.01)

(52) U.S. Cl.
CPC .............. *C01D 7/40* (2013.01); *C01D 7/10* (2013.01); *C01D 7/24* (2013.01)

(58) Field of Classification Search
CPC ............. C01D 7/40; C01D 7/24; C01D 7/10
See application file for complete search history.

(56) References Cited

U.S. PATENT DOCUMENTS

| 2,704,239 A | 3/1955 | Pike |
| 4,406,869 A * | 9/1983 | Nakaya ................ C01D 7/24 159/24.3 |

(Continued)

FOREIGN PATENT DOCUMENTS

WO    WO 2011/161120 A1    12/2011
WO    WO 2013/092754 A1    6/2013

(Continued)

OTHER PUBLICATIONS

Yi Zhu et al., Influence of calcium ions on the crystallization of sodium bicarbonate, Journal of crystal growth, vol. 275, Issue 1-2, (2005), pp. e1333-e1339.

(Continued)

*Primary Examiner* — Richard M Rump
(74) *Attorney, Agent, or Firm* — Beatrice C. Ortego

(57) ABSTRACT

A process for producing crystalline sodium bicarbonate, comprising: providing an aqueous sodium-bicarbonate containing liquor originating from a reactive crystallization step in which first sodium bicarbonate crystals are produced and recovered; feeding at least a portion of said aqueous sodium-bicarbonate containing liquor to a cooling crystallization unit to form second sodium bicarbonate crystals and produce a crystals slurry comprising the second sodium bicarbonate crystals; and withdrawing a portion of the crystals slurry from the cooling crystallization unit for the withdrawn second sodium bicarbonate crystals to be further processed. A portion of the second sodium bicarbonate crystals with- (Continued)

drawn from the cooling crystallization unit may be fed to a sodium bicarbonate reactive crystallization unit, to a caustic unit, or may be separated and dried. The reactive crystallization, separation and/or drying units where the second sodium bicarbonate crystals are further processed may be the same units where the first sodium bicarbonate crystals are processed.

20 Claims, 5 Drawing Sheets

(56) References Cited

U.S. PATENT DOCUMENTS

| | | | |
|---|---|---|---|
| 5,445,805 A | 8/1995 | Zuccarello et al. | |
| 5,540,902 A | 7/1996 | DeSoete | |
| 5,976,485 A | 11/1999 | Zolotoochin et al. | |
| 6,171,567 B1 | 1/2001 | Fagiolini | |
| 6,660,049 B1 | 12/2003 | Day | |
| 6,699,447 B1 | 3/2004 | Nielsen et al. | |
| 7,507,388 B2 | 3/2009 | Ceylan et al. | |
| 2003/0017099 A1 | 1/2003 | Kurtz | |
| 2003/0143149 A1 | 7/2003 | Braman et al. | |
| 2004/0057892 A1 | 3/2004 | Kurtz | |
| 2009/0291038 A1 | 11/2009 | Davoine et al. | |
| 2010/0226840 A1 | 9/2010 | Phillip et al. | |
| 2011/0112298 A1 | 5/2011 | Toyoda et al. | |
| 2014/0113135 A1* | 4/2014 | Hansen | B01D 53/40 428/402 |
| 2016/0145115 A1 | 5/2016 | Savary | |

FOREIGN PATENT DOCUMENTS

| | | |
|---|---|---|
| WO | WO 2014/207120 A1 | 12/2014 |
| WO | WO 2014/207123 A2 | 12/2014 |
| WO | WO 2014/207124 A2 | 12/2014 |

OTHER PUBLICATIONS

Ulrich Joachim: "Crystallization", Kir Othmer Enyclopedia of Chemical Technology, vol. 8, Aug. 16, 2002, pp. 95-147, XP002521007, DOI: 0.1002/0471238961.0318251918152119.401.PUB2.

U.S. Appl. No. 14/900,514, Savary, filed Dec. 21, 2015, WO2014/207120.

U.S. Appl. No. 14/900,524, Savary, filed Dec. 21, 2015, WO2014/207123.

U.S. Appl. No. 14/900,533, Savary, filed Dec. 21, 2015, WO2014/207124.

* cited by examiner

PRODUCTION OF CRYSTALLINE SODIUM BICARBONATE

CROSS-REFERENCE TO RELATED APPLICATIONS

The present application is a U.S. national stage entry under 35 U.S.C. § 371 of International Application No. PCT/US2016/53080 filed Sep. 22, 2016, which claims priority to U.S. provisional application No. 62/222,769 filed Sep. 23, 2015, the whole content of this application being incorporated herein by reference for all purposes.

TECHNICAL FIELD OF THE INVENTION

The invention relates to a process for producing crystalline sodium bicarbonate while minimizing purge volume needed for producing the sodium bicarbonate and also minimizing the loss of alkaline sodium associated with one or more purges. In particular, this invention relates to an improved sodium bicarbonate production process using sequential crystallizations to recover sodium bicarbonate from one or more crystallization unit purges.

BACKGROUND OF THE INVENTION

Sodium bicarbonate ($NaHCO_3$) is a mild alkaline compound with a wide range of applications including uses in human food, animal feed, flue gas treatment, and chemical industries. World production of sodium bicarbonate in 2008 is estimated at 2.8 million tons. Most of its production derives from natural and synthetic sodium carbonate ($Na_2CO_3$). The production of sodium bicarbonate is mainly made by the carbonation of a sodium carbonate aqueous solution with gaseous $CO_2$. The sodium carbonate aqueous solution may come from purified sodium carbonate dissolved in water, or a from a partially decarbonated slurry of crude sodium bicarbonate from the Solvay process, or from a sodium carbonate solution taken out from a sodium carbonate crystallization unit fed with solutions deriving from trona or nahcolite ores.

When sodium bicarbonate is made from solid refined sodium carbonate, the content of sodium carbonate in impurities, such as alkaline metal water-soluble salts, is low enough so that those impurities may efficiently be extracted from the sodium bicarbonate process with the final produced sodium bicarbonate. Therefore no specific purge of such impurities is needed in the corresponding sodium bicarbonate process.

Yet when sodium bicarbonate is made from sodium carbonate streams from either synthetic soda ash (Solvay or derived Hou processes) or from natural minerals (trona or nahcolite related processes), those sodium carbonate streams contain higher levels of soluble impurities, and a purge is needed to control the level of impurities in the sodium bicarbonate process. This purge is generally high and fed back in the corresponding sodium carbonate process or sent to high volumes deposit ponds such as the processes described in U.S. Pat. No. 7,507,388 or in US2009/0291038 or in US2011/112298.

Aside sodium bicarbonate, sodium carbonate, also called soda ash, is a large volume alkali commodity with a total production in 2008 of 48 million tons worldwide, which finds major use in the glass, chemicals, detergents industries, and also in the sodium bicarbonate production industry. The main processes for sodium carbonate production are the Solvay ammonia synthetic process, the ammonium chloride process (Hou process) derived from the Solvay process, and the trona-based processes.

Trona ore is a mineral that contains up to 99% sodium sesquicarbonate ($Na_2CO_3.NaHCO_3.2H_2O$). The sodium sesquicarbonate found in trona ore is a complex salt that is soluble in water and dissolves to yield approximately 5 parts by weight sodium carbonate ($Na_2CO_3$) and 4 parts sodium bicarbonate ($NaHCO_3$). The trona ore is processed to remove the insoluble material, the organic matter and other impurities to recover the valuable alkali contained in the trona.

Trona-based soda ash is obtained from trona ore deposits in Green River (Wyoming), Turkey, China, and Kenya either by conventional underground mining techniques, by solution mining or lake waters processing. The trona-based sodium carbonate from Wyoming comprises about 90% of the total U.S. soda ash production. Sodium carbonate finds major use in the glass-making industry and for the production of baking soda, detergents and paper products.

A typical analysis of the trona ore in Green River is as follows:

TABLE 1

| Constituent | Weight Percent |
| --- | --- |
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Insolubles | 6.3 |
| Organics | 0.3 |

Trona deposits contain diverse highly soluble impurities such as alkaline metal halides (sodium chloride, potassium chloride, sodium fluoride, . . . ), alkaline metal sulfates (sodium sulfate, potassium sulfate, . . . ), alkaline metal nitrate (sodium nitrate, potassium nitrate, . . . ), alkaline metal borate, alkaline metal phosphates, etc. . . . . Those highly soluble impurities are in various proportions depending on the geographic location of the deposits. In particular, sodium chloride and sodium sulfate may represent several percent or several ten percent of trona ore depending on the geographic location.

Trona deposits also include slightly soluble mineral or organic impurities. Examples of slightly soluble mineral are: alkali metal and alkali earth metal silicates, aluminates, titanates, vanadates, metallic compounds and salts.
The organic impurities come from organic sediments that were captured during the formation of the deposits and that frequently have formed oil shales during geological aging. Both mineral and organic soluble impurities may also be partially generated during the trona processing in the mine or on surface operations. In particular thermal treatments, such as calcination, generally amplify the quantity of some soluble impurities such as sodium silicates, and sodium salts of organic compounds by thermal saponification.

Other "insoluble" or very slightly water-soluble mineral impurities found in trona or adjacent to trona deposits are generally mixtures of different minerals, the most frequent of which are calcite, dolomite, pirssonite, zeolite, feldspar, clay minerals, iron/aluminum silicates, and calcium sulfate.

Two main techniques well known in the art are used to recover trona ore from trona ore deposits. The first technique is a mechanical mining, also called conventional mining, such as a room and pillar panel operation or a longwall operation. The second technique is a solution mining recovering wherein trona is dissolved with water and recovered as a solution.

Among the several ways in which sodium carbonate can be recovered from trona ore that contains other salts and impurities, the most widely practiced is the so called "monohydrate process".

In that process a mined trona ore is crushed, then calcined into crude sodium carbonate, then leached with water, the resulting water solution is purified and fed to a crystallization unit where pure sodium carbonate monohydrate crystals are crystallized. The monohydrate crystals are separated from the mother liquor and then dried into anhydrous sodium carbonate. Most of the mother liquor is recycled into the crystallization unit. However, the soluble impurities contained in the trona ore, tend to accumulate into the crystallization unit. To avoid buildup of impurities, the mother liquor must be purged, and a purge stream must exit the sodium carbonate crystallization unit. The sodium carbonate purge stream, which represents important quantities for industrial monohydrate plants, is commonly sent to an evaporative pond, also called tailings pond. The significant quantity of alkali which is contained in the sodium carbonate purge stream is consequently lost. Moreover, the stocking of large quantities of sodium carbonate purge streams in evaporative ponds raise environmental problems, because of the scarce availability of new areas for stocking.

On the other side, sodium bicarbonate is a product with a wide range of interesting properties and a very wide range of applications from high tech ingredients for the pharma industry to the human food and animal feed, and to the use in flue gas treatment. In flue gas treatment, sodium bicarbonate is most likely among the most efficient chemicals for the removal of a wide range of pollutants (most notably the acidic ones such as HCl and sulfur oxides). Its use is limited only by the competition of less efficient but much cheaper chemicals such as lime or even limestone.

The production of sodium bicarbonate is currently almost entirely made by the carbonation of sodium carbonate. In Europe, the carbonation is usually performed in situ in the soda ash plants from $CO_2$ coproduced during the production of soda ash (mainly the $CO_2$ generation in the lime kilns). In the United States, the carbonation is usually made in separate plants which purchase independently the soda ash and the $CO_2$ and combine them.

An alternative method for making sodium bicarbonate is by cooling crystallization of a liquor containing sodium bicarbonate. For example, U.S. Pat. No. 6,699,447 describes a sodium bicarbonate production from nahcolite. The method for producing sodium bicarbonate from a nahcolite deposit comprises injecting water or other aqueous solution at a temperature of at least 250° F. into the deposit, dissolving sodium bicarbonate in the hot water to form a production solution and subjecting the production solution to multiple stages of cooling crystallization. The sodium bicarbonate crystals may be dewatered and dried to form a commercial sodium bicarbonate product.

Because of the nature of the bicarbonate production process, the price for sodium bicarbonate is higher than the price of soda ash. With such economics, the uses of sodium bicarbonate will generally be limited by the competition of cheaper substitutes, most notably in flue gas treatment methods.

US2003/0017099 discloses a process for the joint production of sodium carbonate and bicarbonate, according to which solid trona is dissolved in water and the resulting water solution is fed into a monohydrate crystallization unit in order to produce sodium carbonate. The monohydrate purge is introduced into a decahydrate crystallization unit and the decahydrate crystals converted into sodium bicarbonate. It has been observed that this process is not efficient when the monohydrate purge, depending on the trona source, contains high levels of impurities. In particular, the sodium chloride content of the trona ore can vary depending on the precise trona vein which is exploited. High levels of sodium chloride in the monohydrate purge prevent smooth crystallization of decahydrate.

Several technical alternatives have been proposed to reduce the purge volume from soda ash plants.

US2003/0143149 discloses a process for recovering sodium-based chemicals from sodium carbonate streams such as recycle, purge, and waste streams from sodium carbonate crystallization units, mine water, evaporative pond water and sodium carbonate decahydrate deposits. The sodium bicarbonate from those streams is partially destroyed by a decarbonization and the resulting stream is fed mainly back to a sodium carbonate monohydrate crystallization unit, and the remainder of the resulting decarbonized stream is fed to a sodium carbonate decahydrate crystallization unit, from which purified decahydrate is recovered and recycled to monohydrate crystallization unit and a purge concentrated in impurity such as sodium sulfate is disposed of. Although the purge reduction factor of this process is limited, because, when high concentration of impurities is reached, sodium carbonate and sodium sulfate form decahydrated mixed salts. And if high amounts of sodium sulfate are recycled back to carbonate monohydrate crystallization unit, they generate burkeite crystals ($Na_2CO_3.2Na_2SO_4$) that are detrimental to sodium carbonate monohydrate quality.

US2004/0057892 discloses a process for the production of sodium carbonate and bicarbonate, according to a monohydrate purge from a monohydrate sodium carbonate crystallization unit is introduced into a sodium carbonate decahydrate crystallization unit and the purified decahydrate crystals are converted into sodium bicarbonate. It has been observed that this process is not efficient when the monohydrate purge, depending on the trona source, contains high levels of impurities. High levels of sodium chloride in the monohydrate purge prevent smooth crystallization of sodium carbonate decahydrate.

U.S. Pat. No. 7,507,388 discloses a process for the production of sodium carbonate and bicarbonate, from a pre-purified solution comprising bicarbonate which is first partially decarbonized and then used in both a sodium bicarbonate line and a sodium carbonate monohydrate line. The purge stream of the sodium carbonate monohydrate crystallization unit is either sent into a mixed sodium carbonate decahydrate and sodium sesquicarbonate line wherein resulting filtrate is discarded as the final purge of the process or sent after dilution into a light soda ash line comprising an intermediate sodium bicarbonate carbonation step, the bicarbonate is separated from the filtrate, and this filtrate is also disposed as a final purge. The taught total amounts of generated purges is very high (1.28 tons of purges per ton of dense soda ash) and corresponds to 6 to 15 weight percent of purged sodium carbonate per ton of produced dense soda ash.

US2009/0291038 (Solvay) discloses a process for the joint production of sodium carbonate and sodium bicarbonate crystals, according to which a solid powder derived from sodium sesquicarbonate such as calcined trona is dissolved in water, the resulting water solution is introduced into a crystallization unit, wherein sodium carbonate crystals and a mother liquor are produced, part of the mother liquor is taken out of the crystallization unit (purge of the sodium carbonate crystallization unit) and is carbonized (carbonated) to produce valuable sodium bicarbonate crystals and a second mother liquor, the second mother liquor is optionally decarbonized (debicarbonated) and then sent to a storage pond. In this document, it is taught that the mother liquor used for sodium bicarbonate crystallization should contain preferably at least 175 g/kg of sodium carbonate and not more than 60 g/kg of sodium chloride, and not more than 20 g/kg of sodium sulfate. Consequently, the purge level of sodium alkali (carbonate or bicarbonate) sent to a pond is reduced compared to a decahydrate treatment of the purge but is still important and represents important volumes sent into ponds.

US2011/112298 discloses a method for extending the life of tailings ponds produced from purge streams containing sodium carbonate wherein the purge stream is treated with gaseous carbon dioxide, similar to the US2009/0291038 process, to produce sodium bicarbonate or sodium sesquicarbonate before being introduced in the pond. The produced sodium bicarbonate may be recovered before the introduction of the treated purge stream into tailings pond or recovered after its deposition into the pond. The document is silent on further valorizing the obtained aqueous purge when sodium bicarbonate is recovered.

However, there is still a need in the sodium carbonate and bicarbonate industry, taking into account sustainable development, to be able to further reduce the purge volume which is sent to tailings ponds and reducing the loss of alkali, without impairing operation conditions.

SUMMARY OF THE INVENTION

The invention aims on one side at reducing the amount of alkali lost in a waste pond (such as an evaporative or tailings pond) and on the other side at producing low-cost sodium bicarbonate from one or more low-value purges, and particularly using a purge stream exiting a sodium bicarbonate reactive crystallization unit in which sodium carbonate is reacted with CO2 to form sodium bicarbonate as a feed to at least one sodium bicarbonate cooling crystallization unit.

In particular, the invention aims to use cooling crystallization, in a growth mode, using at least a portion of a purge stream exiting a reactive crystallization processs, in order to grow sodium bicarbonate crystals in a slurry bed (comprising a mother liquor and the growing crystalline sodium bicarbonate particles) inside a cooling crystallization unit. At least a portion of the crystalline sodium bicarbonate particles are withdrawn from the cooling crystallization unit to be further processed. The growth mode in the cooling crystallization unit is preferably carried out by removing the mother liquor inside the cooling crystallization unit through baffles thereby leaving the crystalline particles (solids) behind inside the cooling crystallization unit.

At least the portion of the crystals grown under cooling crystallization is withdrawn from the cooling crystallization unit in a crystal slurry stream.

The crystal slurry stream may be processed in at least one of the following steps selected from the group consisting of:
  passing at least a portion of the crystal slurry stream through a separation unit to recover a solids-enriched slurry or wet solids and then drying the solids;
  passing at least a portion of the crystal slurry stream through a separation unit to recover a solids-enriched slurry to be recycled to the cooling crystallization unit;
  flowing at least a portion of the crystal slurry stream through a cooling circulation loop being hydraulically connected with the cooling crystallization unit and recycling a resulting cooled crystal slurry stream directly to the cooling crystallization unit without solids enrichment in a separation unit (i.e., without increasing solids content);
  passing at least a portion of the crystal slurry stream through a separation unit to recover a solids-enriched slurry to be fed to a reactive crystallization unit; and
  feeding at least a portion of the crystal slurry stream directly to a reactive crystallization unit without solids enrichment in a separation unit (i.e., without increasing solids content).

The crystalline particles withdrawn from the cooling crystallization unit may be:
  separated in a separation unit and dried in a drying unit, which are different and separate than the separation and drying units being fed crystals from a reactive crystallization process;
  separated in a separation unit and dried in a drying unit which are the same than the separation and drying units being fed crystals from a reactive crystallization process;
  separated in a separation unit and dried in a drying unit, wherein the separation unit is different than the separation unit being fed crystals from a reactive crystallization process, but wherein the drying unit is the same than the drying unit being fed crystals from a reactive crystallization process;
  being fed to a reactive crystallization unit, for example in the form of the crystal slurry exiting the cooling crystallization unit or a slurry enriched in solids or as wet solids before entering the reactive crystallization unit, this reactive crystallization unit being either the same or different unit from which the purge feeding the cooling crystallization unit originates;
  separated in a separation unit, wherein the separation unit is different than the separation unit being fed crystals from a reactive crystallization process and then wherein the solids-enriched crystal slurry is directed at least in part to a caustic treatment unit to convert sodium bicarbonate to sodium carbonate, in order for the treated stream exiting the caustic treatment unit to be enriched in sodium carbonate; and/or
  directed in dry form, in slurry form (enriched in solids or not), or in wet solids form to a soda ash plant.

One aspect of the present invention relates to a process for producing crystalline sodium bicarbonate, which comprises the following steps:
  providing an aqueous sodium-bicarbonate containing liquor originating from a reactive crystallization step in which first sodium bicarbonate crystals are produced and recovered;
  feeding at least a portion of said aqueous sodium-bicarbonate containing liquor to at least one cooling crystallization unit under cooling crystallization conditions to form second sodium bicarbonate crystals and to produce a crystals slurry comprising said second sodium bicarbonate crystals; and
  withdrawing at least a portion of said second sodium bicarbonate crystals from said cooling crystallization unit in order for the second sodium bicarbonate crystals to be further processed.

An embodiment of this aspect may comprise the following steps:
- providing an aqueous sodium-bicarbonate containing liquor originating from a reactive crystallization step in which first sodium bicarbonate crystals are produced and recovered;
- subjecting at least a portion of said aqueous sodium-bicarbonate containing liquor to at least one cooling crystallization step to produce a crystals slurry comprising second sodium bicarbonate crystals; and
- separating said second sodium bicarbonate crystals from said crystals slurry to recover second sodium bicarbonate crystals.

In any or all embodiments of the present invention, the portion of said aqueous sodium-bicarbonate containing liquor may be subjected to cooling crystallization in a baffled cooling crystallization unit comprising a crystal settling zone and a crystal magma zone.

In any or all embodiments of the present invention, the process further comprises the following step:
- separating said second sodium bicarbonate crystals from said crystals slurry to recover second sodium bicarbonate crystals; and
- after the separation step, drying at least a portion of recovered second sodium bicarbonate crystals and separately drying at least a portion of recovered first sodium bicarbonate crystals to make two separate sodium bicarbonate products.

In any or all embodiments of the present invention, the process may comprise the following steps:
- separating said second sodium bicarbonate crystals from said crystals slurry to recover second sodium bicarbonate crystals;
- mixing at least a portion of said second sodium bicarbonate crystals with at least a portion of said first sodium bicarbonate crystals; and
- drying the resulting mixture to produce a sodium bicarbonate product.

In any or all embodiments of the present invention, the process may comprise the following step:
- calcining at least a portion of the second sodium bicarbonate crystals to produce soda ash.

In any or all embodiments of the present invention, the process may comprise the following step:
- subjecting at least a portion of the second sodium bicarbonate crystals to a caustic step to convert sodium bicarbonate to sodium carbonate.

In any or all embodiments of the present invention, the step for providing an aqueous sodium-bicarbonate containing liquor originating from a reactive crystallization step may comprise:
- providing a sodium carbonate bearing stream, at least a portion of which is generated by a sodium carbonate crystallization unit;
- bicarbonating the sodium carbonate bearing stream with a gas comprising $CO_2$ to produce an aqueous suspension comprising said first sodium bicarbonate crystals and further to produce at least a portion of said aqueous sodium-bicarbonate containing liquor which is fed to said at least one cooling crystallization unit; and
- adding at least a portion of recovered second sodium bicarbonate crystals directly to the reactive crystallization unit from which said aqueous sodium-bicarbonate containing liquor originates, and/or to the portion of said sodium carbonate bearing stream which is fed to the reactive crystallization unit.

In any or all embodiments of the present invention, the process may further comprise performing at least one of the following steps selected from the group consisting of:
- adding at least one crystal modifier additive in the portion of said sodium carbonate bearing stream prior to being subjected to the reactive crystallization step; and
- adding at least one crystal modifier additive directly to a reactive crystallization unit.

In additional or alternate embodiment according to the present invention, the process may further comprise performing at least one of the following steps selected from the group consisting of:
- adding at least one crystal modifier additive in said portion of the aqueous sodium bicarbonate-containing liquor prior to being subjected to cooling crystallization;
- adding at least one crystal modifier additive directly to a cooling crystallization unit; and
- adding at least one crystal modifier additive to a cooling circulation loop in fluid communication (hydraulically connected) with the cooling crystallization unit.

In any or all embodiments of the present invention, the process may further comprise the following steps: wherein fine particles are present in said portion of said sodium carbonate bearing stream; and wherein mixing at least a portion of recovered second sodium bicarbonate crystals recovered from the cooling crystallization step with the portion of said sodium carbonate bearing stream which is subjected to reactive crystallization forms a combined stream and results in increasing the temperature of the resulting combined stream to dissolve said fine particles.

In any embodiment of the present invention where the crystals slurry withdrawn from the cooling crystallization unit is separated, the separation of the second sodium bicarbonate crystals slurry may be carried out in the same separation step in which the first sodium bicarbonate crystals are separated, so that this separation step separates at the same time both the first and second sodium bicarbonate crystals.

In any or all embodiments of the present invention, the at least a portion of the second sodium bicarbonate crystals may be directed to a reactive crystallization unit in order for these second sodium bicarbonate crystals to further grow in size.

In any or all embodiments of the present invention, the at least one cooling crystallization unit has an overflow which is lean in crystal content, and at least a portion of this overflow is directed to a tailings pond.

In preferred embodiments according to the present invention, the cooling crystallization unit is a growth cooling crystallization unit.

In any or all embodiments of the present invention, the process may further comprise at least one of the following steps:
- bubbling $CO_2$ either into the sodium bicarbonate-containing feed to the cooling crystallization unit or in the slurry being recirculated in a cooling circulation loop in fluid communication (hydraulically connected) with the cooling crystallization unit; and/or
- introducing $CO_2$ in the form of a blanket over the crystal slurry in the cooling crystallization unit.

Another aspect of the present invention concerns a process for producing crystalline sodium bicarbonate from a sodium carbonate bearing stream, at least a portion of which is generated by a sodium carbonate crystallization unit, which comprises the following steps:

a)—bicarbonating the sodium carbonate bearing stream with a gas comprising $CO_2$ to produce an aqueous suspension comprising first sodium bicarbonate crystals;

b)—separating the aqueous suspension in order to obtain first sodium bicarbonate crystals and an aqueous mother liquor, said aqueous mother liquor comprising sodium bicarbonate; and c)—subjecting at least a portion of the aqueous mother liquor to cooling crystallization to produce a slurry and optionally an overflow stream, said slurry comprising second sodium bicarbonate crystals.

Step (a) includes a reactive crystallization, whereas step (c) includes a cooling crystallization.

In preferred embodiments according to the present invention, a cooling crystallization unit is used in step (c) and more preferably, it is a growth crystallization unit.

In some aspects, the second crystals withdrawn from the cooling crystallization unit are subjected to a separation and then to a drying step to form a product. Such product comprises sodium bicarbonate powder which is characterized by a particle size distribution and a chemical composition.

In some aspects, in particular when the particle size distribution of second crystals obtained from the cooling crystallization step (c) matches what is desired for a salable sodium bicarbonate product after drying (meaning the dried crystals would meet the specifications of a sodium bicarbonate product), the slurry comprising the second sodium bicarbonate crystals is preferably subjected to a separation to recover the second sodium bicarbonate crystals. Such separation may be carried out in a separation unit being different than one ore more separation units used in the separation step (b) which separates the first sodium bicarbonate crystals.

Alternatively, the separation of the slurry comprising the second sodium bicarbonate crystals may be carried out in the same separation step (b) in which the second crystals are recovered, so that this step recovers the first and second crystals from both crystallization units. This embodiment may be preferably carried out when the particle size distribution of the first crystals from the reactive crystallization step (a) is same or similar to that of the second crystals from the cooling crystallization step (c).

In some embodiments, the second sodium bicarbonate crystals may be directed to the reactive crystallization step (a) in order for the second crystals to grow bigger. This may be done in particular when the particle size distribution of the second crystals from the cooling crystallization step (c) is lower than what is desired for the product obtained after drying. In such embodiment, the second crystals may be mixed with the sodium carbonate bearing stream used as feedstock to the reactive crystallization step (a). In this way, mixing such second crystals may increase the temperature of the recovered solids stream and result in dissolving fines particles when present in the sodium carbonate-bearing stream.

In other aspects, and in particular when the particle size distribution of second crystals from the cooling crystallization step (c) is so low that it would negatively impact the crystallization in the reactive crystallization step (a) by influencing the particle size of the first crystals if they were to be recycled to the reactive crystallization step (a), the second sodium bicarbonate crystals withdrawn from the cooling crystallization unit in step (c) may be directed to a caustic treatment step (e) in order to convert the sodium bicarbonate to sodium carbonate, which then can be returned to the sodium carbonate production process and/or to the reactive crystallization step (a).

The caustic treatment may comprise adding a caustic additive to at least a portion of the second sodium bicarbonate crystals withdrawn from the cooling crystallization unit in step (c). The caustic additive may include a hydroxide compound. A suitable caustic additive may comprise or consist of lime, sodium hydroxide, or mixture thereof.

In preferred embodiments of the various aspects of the present invention, a crystal modifier additive is used during crystallization to make sodium bicarbonate crystals, such as in the cooling crystallization unit to make the second sodium bicarbonate crystals and/or in the reactive crystallization unit to make the first sodium bicarbonate crystals.

When at least one crystal modifier additive is present in the crystals slurry inside the cooling crystallization unit or in a reactive crystallization unit to make sodium bicarbonate crystals, the at least one crystal modifier additive comprises an additive selected from the group consisting of:

an alkali metal salt,
phosphates,
phospholipids,
carboxylates,
carboxilic acids,
anionic hexametaphosphate,
anionic polyphosphate,
anionic polyphosphonate,
soy lecithin,
citric acid,
anionic polycarboxylate polymer,
anionic polyacrylate polymer,
anionic polyacrylate-polyacrylamide co-polymer,
anionic hydrolyzed polymaleic polymers,
anionic maleic-acrylic acids copolymers,
anionic acrylic acid-phosphonic acid copolymers,
sulfates,
sulfonates,
polysulfonates,
amines (for example, quarternary amines),
hydroysultaines,
polycarboxylates,
polysaccharides,
polyethers and ether-phenols,
alkali metal hexametaphosphate,
sulfosuccinates,
amidosulfonates,
amine sulfonates, and
any combination of two or more thereof.

In preferred embodiments of the present invention, the at least crystal modifier additive used in either or both of the cooling and reactive crystallization units comprises an alkali metal salt, such a calcium salt. A preferred calcium salt is calcium chloride.

Crystal modifier additives are preferably used in both cooling and reactive crystallization units. The crystal modifier additive used in the cooling crystallization unit may be different that the crystal modifier additive used in the reactive crystallization unit. Preferably the same crystal modifier additive is used in the cooling crystallization unit and in the reactive crystallization unit. More preferably, the same crystal modifier additive which is used in the cooling crystallization unit and the reactive crystallization unit comprises calcium.

When a calcium compound is used as a crystal modifier additive in the reactive crystallization unit to make the first sodium bicarbonate crystals, the calcium compound may be added to reach an amount from 30 mg to 200 mg Ca per kg of the first sodium bicarbonate crystals produced.

When calcium is used as a crystal modifier additive in the cooling crystallization unit to make the second sodium bicarbonate crystals, calcium may be added to reach an amount from 150 mg to 500 mg Ca per kg of the second sodium bicarbonate crystals produced.

An advantage of the present invention is that there is a considerable reduction in the amount of alkali loss in the one or more waste ponds (such as evaporative pond or tailings pond) due to purging, such reduction being effected by the use of sequential crystallization steps, which utilizes:
- the purge originating from a sodium carbonate crystallization unit as at least a part of the feed to a sodium bicarbonate reactive crystallization unit in a first crystallization step, and
- the purge originating from a sodium bicarbonate reactive crystallization step as at least a part of the feed to a sodium bicarbonate cooling crystallization unit in a subsequent (second) crystallization step.

This successive use of purges exiting a sodium carbonate process as feeds to succesive sodium bicarbonate crystallization units using different crystallization conditions results in increasing the total yield of sodium bicarbonate production. It is expected that the increase in yield for sodium bicarbonate production will be up to 40%, preferably from 10% to 35%, more preferably from 10% to 30%, most preferably from 10% to 25%.

Another advantage of the use of sequential crystallization steps to extract more salable products from purges that would otherwise be rejected to a waste pond (such as an evaporative pond or tailings pond) is the reduction in solids accumulation in that waste pond. This in turn increases the usable pond lifetime and increases the time period between pond lifts at which point the height of a waste pond wall is raised in order to increase volumetric capacity and allow for more solids deposition and accumulation inside this waste pond.

Another embodiment of the present invention relates to a particulate sodium bicarbonate product made according to the present sodium bicarbonate production process. In particular embodiments, the particulate sodium bicarbonate product may comprise a mixture of the first sodium bicarbonate crystals originating from a reactive crystallization step and of the second sodium bicarbonate crystals originating from a cooling crystallization step.

Another embodiment of the present invention relates to a process for treating a gas containing acid gas pollutants, preferably HCl and/or $SO_x$ (sulfur oxides) comprising:
- injecting a reagent comprising a particulate sodium bicarbonate product in the gas, wherein said sodium bicarbonate product is made according to the present sodium bicarbonate production process;
- reacting at least a portion of the pollutants with the reagent; and
- separating the product of the reaction from the treated gas.

BRIEF DESCRIPTION OF THE DRAWINGS

For a detailed description of the preferred embodiments of the invention, reference will now be made to the accompanying drawings in which.

DEFINITIONS

Figure 1:
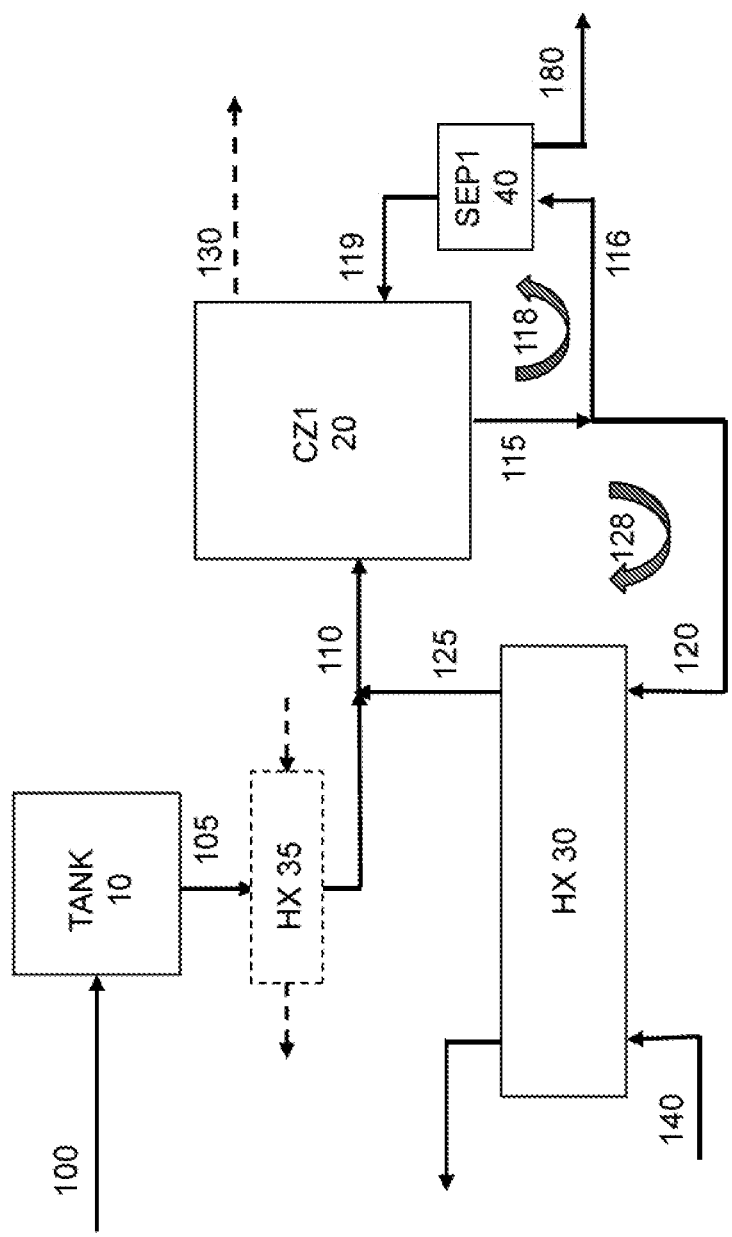
FIG. 1 illustrates a simplified process flow diagram for a sodium bicarbonate production process according to an embodiment of the present invention using a cooling crystallization unit using two loops, one of said loops comprising a feed heat exchanger for the feed to the cooling crystallization unit, and the other loop comprising at least one separation unit to recover at least a portion of the second sodium bicarbonate crystals made in the cooling crystallization unit.

For purposes of the present description, certain terms are intended to have the following meanings.

The term "purge" refers to a stream withdrawn from a part of a process to limit impurity concentration in this process.

The term "impurity" refers to a compound different from the sodium bicarbonate to be produced.

The term "debicarbonating" refers to the action of decreasing the amount of bicarbonate of a stream.

As used herein, the term "trona" includes any source of sodium sesquicarbonate.

As used herein, the term 'additive' refers to a chemical additive.

As used herein, the term 'fines' refers to particles of less than 45 microns or of US mesh size of 325 or more.

The term 'comprising' includes 'consisting essentially of' and also "consisting of".

DETAILED DESCRIPTION OF THE PREFERRED EMBODIMENTS

The present invention relates to the production of crystalline sodium bicarbonate comprising at least one cooling crystallization step using a sodium bicarbonate-containing liquor as feed.

In a preferred embodiment of the present invention, the production of crystalline sodium bicarbonate comprises carrying sequential crystallization steps, wherein at least two of the crystallization steps differ in their basic principle of operation. At least one crystallization step comprises cooling crystallization and at least one other crystallization step comprises reactive crystallization. The reactive crystallization step ic preferably carried out before the cooling crystallization step.

In a more preferred embodiment of the present invention, the production of crystalline sodium bicarbonate comprises sequential reactive and cooling crystallization steps, wherein a purge from the reactive crystallization step serves as at least one feed to the cooling crystallization step. In the reactive crystallization step, sodium carbonate reacts with CO2 while in the cooling crystallization step, a sodium bicarbonate containing liquor exiting the reactive crystallization (for example, reactive crystallization purge) is subjected to lower temperature conditions which favors the crystallization of the sodium bicarbonate contained in the sodium bicarbonate containing liquor due to the difference in solubility when lowering temperature.

In most preferred embodiment using sequential crystallization steps, the sodium bicarbonate-containing liquor used as feed in the cooling crystallization step comprises, or consists essentially of, or consists of, a purge exiting at least one preceding reactive crystallization step.

In preferred embodiments of the present invention which use a reactive crystallization step, the feed to the sodium bicarbonate reactive crystallization step comprises, or consists of, a sodium carbonate liquor which is derived in part from sodium sesquicarbonate, a major component of trona. Sodium sesquicarbonate is a double salt of sodium carbonate and sodium bicarbonate. The feed to the sodium bicarbonate reactive crystallization step preferably comprises, or consists of, a sodium carbonate containing purge exiting a sodium carbonate monohydrate process.

Providing Sodium Bicarbonate-Containing Feed to Cooling Crystallization

In an embodiment of the present invention, the sodium bicarbonate-containing feed to such cooling crystallization step comprises, or consists essentially of, or consists of, a solution in which a sodium bicarbonate-containing mineral such as nahcolite is dissolved.

In a preferred embodiment of the present invention, the sodium bicarbonate-containing feed to such cooling crystallization step comprises, or consists essentially of, or consists of a liquor being purged from (i.e., exiting) a reactive crystallization process in which a first type of sodium bicarbonate crystals (also termed herein "first sodium bicarbonate crystals") are made. Such purge liquor may also be called "reactive crystallization purge". Such purge liquor is generally recovered once the crystallization liquor containing sodium bicarbonate solids is separated and at least part of a resulting solids-lean liquor obtained by such separation provides the purge to the reactive crystallization.

In alternate embodiment of the present invention, the sodium bicarbonate-containing feed to such cooling crystallization step comprises, or consists essentially of, or consists of a reactive crystallization purge and a solution in which a sodium bicarbonate-containing mineral such as nahcolite is dissolved. The reactive crystallization purge and the nahcolite solution may be mixed before being fed to the cooling crystallization step. Or the reactive crystallization purge and the nahcolite solution may be separately fed to the cooling crystallization step.

The cooling crystallization unit is operated at a temperature lower than the reactive crystallization unit. The temperature in the cooling crystallization unit is preferably at least 10° C. lower, more preferably at least 15° C. lower, preferably at least 20° C. lower than the temperature in the reactive crystallization unit.

A reactive crystallization purge used in the sodium bicarbonate-containing feed to such cooling crystallization step may have a temperature ranging from 65° C. to 95° C. (from 149° F. to 203° F.).

At least a portion of the sodium bicarbonate-containing feed to such cooling crystallization step is cooled prior to entering the cooling crystallization unit which has an operating temperature ranging from 20° C. to 35° C. (from 68° F. to 95° F.).

In preferred embodiments of the present invention, the sodium bicarbonate-containing feed to such cooling crystallization step comprises a reactive crystallization purge.

A typical reactive crystallization purge exiting a sodium bicarbonate reactive crystallization unit may contain from 0.5 wt % up to 10.5 wt % sodium bicarbonate, preferably from 0.7 wt % up to 10.3 wt % sodium bicarbonate or from 5 wt % up to 10 wt % sodium bicarbonate. The $NaHCO_3$ content may be on average about 6.5-7 wt %.

The Total Alkalinity (weight % based on $NaHCO_3$) of the reactive crystallization purge may range from 10% to 22%, preferably from 13% to 18%. The TA (weight % based on $NaHCO_3$) may be on average about 15-15.5%.

The sodium carbonate content of the reactive crystallization purge may range from 3.5 wt % to 9 wt %, from 4 wt % to 7 wt %. The $Na_2CO_3$ content may be on average about 5-5.5 wt %.

The NaCl content of the reactive crystallization purge may range from 0.2 wt % to 3.6 wt %. The NaCl content may be on average about 1.8-2 wt %.

The $Na_2SO_4$ content of the reactive crystallization purge may range from 0.1 wt % to 3.0 wt %. The $Na_2SO_4$ content may be on average about 1.2-1.6 wt %.

The Total Organic content (TOC) of the reactive crystallization purge may range for example from 145 ppm TOC to 1810 ppm TOC, with an average around 916 ppm TOC.

The reactive crystallization purge may comprise fines in an amount of no more than 5 wt %, preferably in an amount of no more than 3 wt %, more preferably in an amount of from 0.1 to 3 wt %, when the sodium bicarbonate-containing feed to the cooling crystallization step contains at least a part of a reactive crystallization purge.

The part of the reactive crystallization purge which is fed to the cooling crystallization step may be subjected to a pre-heating step in order to dissolve the fines which it may contain before its entry into the cooling crystallization unit. The presence of fines in the reactive crystallization purge when being fed to the cooling crystallization unit may indeed have an impact on the crystal size of sodium bicarbonate in the cooling crystallization unit. For that reason, removing them by dissolution by increasing the temperature of the reactive crystallization purge portion being fed to the cooling crystallization step should help increase the sodium bicarbonate particle size being formed in the cooling crystallization unit.

The pre-heating step for the reactive crystallization purge may be carried out in any type of heat exchanger. A preferred heat exchanger comprises a shell-and-tube exchanger. For example an indirect heat exchanger using a heat transfer fluid (e.g., steam) on the shell side may be used to heat the portion of the purge (being fed to the cooling crystallization unit) passing through the tube side.

Making Crystalline Sodium Bicarbonate Via Cooling Crystallization

At least a portion of the purge originating from a sodium bicarbonate reactive crystallization unit is used as a feed source and is directed to the cooling crystallization unit. The cooling crystallization unit comprises a feed inlet through which the one or more feed sources enters and further comprises at least one slurry outlet through which a crystal slurry stream exits. An external-circulation slurry cooling loop comprising such cooling exchanger is hydraulically connected to the cooling crystallization unit, from the slurry outlet of the cooling crystallization unit, through the cooling exchanger, up to the feed inlet of the cooling crystallization unit. A portion of the crystal slurry (also called 'crystal magma') from the cooling crystallization unit is withdrawn from the slurry outlet of the cooling crystallization unit and this slurry stream is cooled in the external-circulation cooling exchanger. The cooled slurry stream is recycled to the cooling crystallization unit. This cooled slurry stream exiting a cooling heat exchanger is preferably mixed with the purge portion originating from a sodium bicarbonate reactive crystallization unit so as to form the feed (or at least one feed source) to the cooling crystallization unit.

To facilitate the delivery of the feed to the cooling crystallization unit, a draft tube being in fluid communication with the crystallization unit feed inlet and comprising a vertical portion comprising a truncated frustoconical end may be used inside the cooling crystallization unit. The feed moves upward inside the draft tube and exits the frustoconical end in order to be dispersed into a crystal magma already present into the cooling crystallization unit.

Salts, such as sodium bicarbonate, can be produced by precipitation reactions and generally crystallize to form an orderly and repetitive arrangement of salt molecules. Crystal formation first involves nucleation of a solid phase from a liquid phase followed by crystal growth, the orderly addition of the molecules. Supersaturation is the driving force effecting this phase change. The cooled, slightly supersaturated feed liquor entering the cooling crystallization unit contacts the existing crystal magma where the supersaturation is relieved onto the growing crystals in a manner that promotes crystal growth over nucleation.

It is thus preferred for the cooling crystallization unit to be a growth crystallization unit.

For growth crystallization, the sodium bicarbonate-containing feed is fed at a temperature $T_1$ and a concentration below the saturation point at $T_1$, to the crystal slurry (comprising sodium bicarbonate crystals in a liquid phase) in a cooling crystallizing unit, the temperature $T_2$ of the crystal slurry being below the saturation temperature of the feed solution, and the concentration of the feed and the temperatures $T_1$ and $T_2$ being such that the degree of supersaturation in the liquid phase of the crystal slurry is kept relatively low causing the size of the crystals in the slurry to grow without a high degree of nucleation. The sodium bicarbonate crystals initially present in the slurry are permitted to grow into the desired large crystals having a more uniform particle size distribution. The normal precipitation (nucleation) of the sodium bicarbonate by reason of the temperature and concentration fluxes in the crystal slurry is minimized by maintaining the sodium bicarbonate feed solution at less than saturation concentrations and providing a long residence time in the crystallizer. In this manner, the feed stream does not nucleate when it is introduced into the crystallizer slurry and, because of the substantial dilution effect upon introduction into the crystallizing unit, the dissolved sodium bicarbonate in the feed does not precipitate and form independent nuclei. In this manner, crystal growth in the slurry takes place primarily, if not exclusively, on the sodium bicarbonate crystals initially present in the slurry, thus permitting precise control of both the size and particle size distribution of the produced crystals.

To help facilitate crystal growth, the cooling crystallization unit is preferably baffled, and comprises a crystal magma zone and a crystal settling zone. These zones are preferably delimited by one or more internal baffles located inside the cooling crystallization unit. The one or more internal baffles are preferably vertical (although they could be slanted from vertical) and extend from the top of the cooling crystallization unit down to part ways into the crystals magma. The one or more internal baffles do not reach the bottom of the cooling crystallization unit. The placement of the one or more baffles inside the cooling crystallization unit is such that they partially divide the volumetric space taken by the crystal slurry inside the cooling crystallization unit into these two zones: the crystal magma zone unit and the crystal settling zone. There is still fluid communication between these two zones. The crystal magma zone is generally located at the center of the cooling crystallization unit, while the crystal settling zone surrounds this crystal magma zone and is at the periphery of the cooling crystallization unit.

The sodium bicarbonate containing feed enters the crystal magma zone in the cooling crystallization unit. The sodium bicarbonate containing feed exits the draft tube via a frustoconical end of the draft tube vertical portion located in the crystal magma zone. The frustoconical end of the draft tube vertical portion should be at a higher elevation than that of the bottom of the baffle(s).

On the periphery of the crystal magma zone behind the baffled area in the crystallization unit, a slow upward flow of crystal magma enters the crystal settling zone. The upward velocity of this crystal magma should be low enough in order for the crystals to fall back into the crystal magma zone enriching the crystal density in the crystal magma near the bottom of the cooling crystallization unit.

A portion of the rising clarified slurry is withdrawn from the crystal settling zone as an overflow. At least a portion or all of this overflow is sent to a tailings pond.

It is envisioned to operate the cooling crystallization unit at atmospheric pressure or under vacuum. When operated under a vacuum, flash cooling of the slurry should help create the supersaturation for crystal growth over a bed of existing crystals.

There are several constraints required for the proper operation of the cooling exchanger and the cooling crystallization unit. The temperature of the cooling crystallization unit must be maintained at a point lower than the feed; however not so low that excessive supersaturation occurs. The difference in temperatures between the feed and the exit stream of the cooling crystallization unit determines the quantity of sodium bicarbonate that will precipitate in the cooling crystallization unit. If that difference is too great, causing excessive supersaturation, the crystal size of the sodium bicarbonate will be small. If small crystal size is not a concern to customers, there may not be a problem. But if large crystals are an important sales consideration, the temperature difference must be adjusted accordingly.

The supersaturation in the cooling crystallization step must be controlled to achieve the proper growth of large crystals i.e., greater than 50 microns and preferably greater than 100 microns). Therefore, if the flow rate of the feed to the cooling crystallization step is large, the recirculation rate of the crystal magma stream at that step must also be large.

In fact, in order to maintain the proper supersaturation, the circulation rate of the crystal magma stream must be many times larger than the flow rate of the feed stream. In preferred embodiments, the ratio of the circulation rate of the crystal magma stream to the flow rate of the feed stream to the cooling crystallization step may be from 50.1 up to 500:1, or more preferably from 75:1 up to 400:1, yet more preferably from 100:1 up to 300:1, and more preferably from 125:1 up to 200:1.

At some point, the size of any pumps and/or heat exchangers required to effect the desired supersaturation may exceed the conventional sizes commercially available—as such several circulation streams may be utilized for the cooling crystallization step.

In order to maximize the concentration of sodium bicarbonate present and prevent the formation of sodium carbonate, an embodiment to the present invention may comprise adding carbon dioxide to a feed tank (where the purge exiting a reactive crystallization unit may be stored) and/or the cooling crystallization unit. The $CO_2$ may either be bubbled into the sodium bicarbonate-containing feed or in the recirculated slurry in the cooling circulation loop, both to maintain the desired equilibrium and as a processing aid; or $CO_2$ may be introduced in the form of a blanket over the crystal slurry in the cooling crystallization unit. The $CO_2$ source may have different origins. In one recommended embodiment, the $CO_2$ may originate from natural gas separation or from combustion of one or more hydrocarbonaceous material such as in a natural gas plant, after having been concentrated for example through an amine process. The $CO_2$ may be produced by indirect calcination of a composition releasing $CO_2$ upon calcination, preferably a composition comprising an alkali bicarbonate, more preferably sesquicarbonate or trona. Preferably, the $CO_2$ may originate from a process which makes soda ash, for instance $CO_2$ generated in calciners used to calcine trona ore.

The cooling crystallization unit should have an outlet temperature that could be anything from a few degrees below the feed temperature (which would result in producing low yields) to very cold temperatures down to −17° C. or 0° F. (or a few degrees cooler before sodium carbonate decahydrate is produced instead of sodium bicarbonate) (utilization of refrigeration cooling) to increase the yields and likely impact the particle size.

The outlet temperature of the cooling crystallization unit may be generally from about 20° C. to 35° C. (from about 80° F. to 95° F.).

A purge exiting a reactive crystallization unit may have a temperature from about 65° C. to 95° C. (from 149° F. to 203° F.), preferably from about 71° C. to 76.7° C. (from about 160° F. to 170° F.).

A part of the crystal magma (which is a sodium bicarbonate containing slurry) is generally withdrawn as a crystal slurry stream from the bottom of the cooling crystallization unit. At least part of this withdrawn crystal slurry stream is re-circulated in the external-circulation cooling slurry loop, generally by a circulation pump, through the cooling exchanger to control the cooling crystallization operating temperature, for example temperature to be from 20° C. to 35° C. (from 80 to 95° F.) and is recycled to the cooling crystallization unit. This part of this withdrawn crystal slurry stream is preferably cooled to from about 26.7° C. to 46.1° C. (from about 80° F. to 115° F.), preferably from about 32.2° C. to 37.8° C. (from about 90° F. to 100° F.), more preferably from about 26.7° C. to 35° C. (from about 80° F. to 95° F.). The cooling crystallization unit uses the external-circulation cooling exchanger with a cooling fluid, for example water, to reduce the solubility of sodium bicarbonate. The selection for the cooling fluid should be such as to minimize the differential in temperature between the crystal magma and the cooling fluid. The cooling fluid is preferably on the shell side of the cooling heat exchanger at a high flowrate for good heat transfer with just enough make-up cooling fluid to control the desired crystallization temperature.

The cooling preferably results in a supersaturated slurry that causes the sodium bicarbonate to precipitate on existing crystals in the crystal magma of the cooling crystallization unit. The difference in solubility of sodium bicarbonate at the feed inlet and at the slurry outlet of the cooling crystallization unit forces crystallization.

The crystallization process continues until the crystal density in the crystal magma zone reaches approximately from 15% to 20% in apparent settled volume, at which time at least a portion of the crystal magma (slurry) can be withdrawn and directed to a post-crystallization step.

Another part of the withdrawn crystal slurry stream (which is not subjected to cooling) may be directed to a separation unit.

Post-Cooling Crystallization Step(s)

In preferred embodiments of the process according to the present invention, the post-cooling crystallization step(s) may include:
  separation of solids from at least a portion of the crystals magma withdrawn from the cooling crystallization unit to recover solids from the cooling crystallization step, and
  subjecting the solids recovered from the cooling crystallization step to at least one step selected from the group consisting of:
    drying at least a portion of the solids recovered from the cooling crystallization step,
    calcining at least a portion of the solids recovered from the cooling crystallization step,
    mixing at least a portion of the solids recovered from the cooling crystallization step with at least a portion of solids recovered from a reactive crystallization step;
    subjecting at least a portion of the solids recovered from the cooling crystallization step to a caustic treatment;
    adding at least a portion of the solids recovered from the cooling crystallization step to a reactive crystallization unit,
    adding at least a portion of the solids recovered from the cooling crystallization step to a sodium carbonate feed to a reactive crystallization unit, and
    any combination of two or more of these steps.

When a post-crystallization step includes the separation of solids from the crystal magma to recover solids from the cooling crystallization step, the separation of solids may comprise passing at least a portion of the withdrawn crystal slurry stream through at least one separation unit to recover solids from the cooling crystallization step.

The separation unit may comprise any suitable solid-liquid separation unit which is capable of separate the solids from the liquid phase in the crystals magma. The separation unit may comprise for example at least one cyclone, at least one centrifuge, at least one filter, at least one thickener (settling tank), or combination thereof. Preferably, the separation unit may comprise at least one cyclone in series with a centrifuge; that is to say, the separation unit may comprise at least one cyclone from which a solids-enriched stream exiting the at least one cyclone is fed to at least one centrifuge. In other embodiments, the separation unit may comprise at least one thickener (settling tank) to generate a thickened slurry enriched in solids content compared to the stream feeding this tank.

The separation step generally forms a clarified stream. The clarified stream is lean on solid content, in that its solid content is much lower than that of the crystal slurry (magma) being fed to the separation step. At least a part of the clarified stream may be recycled in the process according to the invention. But generally, at least a part or all of the clarified stream is sent to a waste (tailings) pond. This clarified stream is generally termed the 'cooling crystallization purge'.

When the crystal sizes produced in the cooling crystallization unit are large enough to be of suitable size for making a salable product, the separation of solids from the crystal slurry (magma) is generally carried out.

In some embodiments when the separation step comprises a cyclone, the portion of the crystal slurry stream from the cooling crystallization unit may be subjected to the cyclone separation, in which crystals having the desired product size range are removed in the solids-enriched stream exiting the cyclone while allowing crystals outside of this range (that is to say, of smaller size) to remain in the clarified stream. These removed crystals in the solids-enriched stream exiting the cyclone could be fed to another separation unit such as a centrifuge to removed more liquid from that stream and increase its solid content for these solids to be dried or calcined to make a final product. At least a part of the clarified stream (containing the smaller crystals) exiting the cyclone may be recycled to a reactive crystallization step to allow more growth for these smaller crystals.

The process may include subjecting the solids recovered from the cooling crystallization step to at least a post-crystallization step selected from the group consisting of:
  recovering solids from at least a portion of the crystal slurry (magma) stream exiting the cooling crystallization unit in the separation step, and drying or calcining at least a portion of the solids recovered step to form one product;
  before the separation step, mixing at least a portion of the crystal slurry stream exiting the cooling crystallization step with at least a portion of solids slurry exiting a reactive crystallization step to form a slurry mixture, recovering solids from at least a portion of the crystal slurry mixture in the separation step to recover solids originating from both crystallization steps, and drying or calcining at least a portion of these solids recovered to form a crystalline product originating from both crystallization steps;
  mixing at least a portion of the solids recovered from the cooling crystallization step with at least a portion of solids recovered from a reactive crystallization step to form a solids mixture and drying or calcining at least a portion of said solids mixture to form a crystalline product originating from both crystallization steps; and
  any combination of two or more of these steps.

Drying at least a portion of the recovered solids preferably forms a sodium bicarbonate product.

Drying may be carried out in a tray-type or fluidized-bed or flash drying unit at a temperature generally less than 80° C., preferably from 70 to 90° C., more preferably from 70 to 85° C., most preferably from 70 to 75° C. Since the sodium bicarbonate crystals decompose at temperatures higher than 75° C., the residence time during drying should be as short as possible. For that reason, a flash dryer (which is typically a vertical tube drier) may be preferred for its short residence time. A flash dryer offers an effective method of removing surface or unbound moisture from wet solids. Because the flash drying employs a low residence time within the drying unit, the unbound moisture is "flashed" off the solids.

Following the drying step, a stage screening may be used in order to classify the sodium bicarbonate crystals, those in various sizes according to the specifications set by the market. Three distinct classes of refined sodium bicarbonate product may be obtained as pharmaceutical grade, feed grade and technical grade. Standard grades of sodium bicarbonate and special grades are manufactured to meet customers' specific requirements, and particle size is the major determinant of grades. Powdered #1 and fine granular #2 have a wide range of uses in foods, chemicals, and pharmaceuticals. Granular grades #4 and #5 are found in foods and doughnuts, cleaning compounds, pharmaceuticals, and many other products. Industrial grade sodium bicarbonate is used in diverse applications, including oil well drilling fluids, fire extinguishing materials, flue gas mitigation (for pollution control), and water treatment.

Calcining at least a portion of the recovered solids preferably forms a sodium carbonate product, also called soda ash. The sodium carbonate product made by calcining may include light soda ash and/or dense soda ash. For example, in order to carry out a light soda ash production, calcination may be carried out at a temperature from 150 to 220° C. (e.g., at 180° C.). Calcination may be carried out in a rotary calciner such as utilizing high pressure (e.g., from 10 to 28 bar absolute) indirect steam.

When the crystal sizes produced in the cooling crystallization unit are not large enough to be of suitable size for making a salable sodium bicarbonate product, the process may include subjecting the solids recovered from the cooling crystallization step to at least a post-crystallization step selected from the group consisting of:
  adding at least a portion of the solids recovered from the cooling crystallization step to a reactive crystallization unit,
  adding at least a portion of the solids recovered from the cooling crystallization step to a sodium carbonate feed to a reactive crystallization unit, and
  any combination of two or more of these steps.

The recovery route, which indirectly or directly sends at least part of the solids originating from the cooling crystallization unit to the reactive crystallization unit, provides for additional growth of the sodium bicarbonate crystals originating from the cooling crystallization unit which may be too small in size in the reactive crystallization unit. Mixing the recovered solids stream into the sodium carbonate purge liquor (feeding the reactive crystallization unit) would raise the temperature of the recovered solids stream, which would help dissolve fines in the recovered solids stream if they are any present herein. Another advantage may also result in some pre-cooling of the sodium carbonate containing feed stream to the reactive crystallization step.

When the crystalline sodium bicarbonate particles recovered from the cooling crystallization unit are too small to be fed to the reactive crystallization step without negatively impacting the sodium bicarbonate crystal size in the reactive crystallization unit, a possible recovery route would be to perform a caustic treatment on the crystalline sodium bicarbonate particles recovered from the cooling crystallization step to convert sodium bicarbonate to sodium carbonate, and then return this sodium carbonate to a soda ash production process and/or to the reactive crystallization step. The caustic treatment may comprise adding a caustic additive to recovered crystalline sodium bicarbonate particles recovered from the cooling crystallization step. The caustic additive may include a hydroxide compound. A suitable caustic additive may comprise or consist of lime, sodium hydroxide or mixture thereof.

Making a Sodium Carbonate-Containing Feed for Reactive Crystallization

In the reactive crystallization step for the production of sodium bicarbonate according to a preferred embodiment of the invention, solid powder derived from sodium sesquicarbonate is dissolved in water. The expression "derived from sodium sesquicarbonate" means that the powder may consist essentially of sodium sesquicarbonate, but may also consist of a product which results from a direct transformation of sodium sesquicarbonate. For example, the transformation can be a calcination which transforms the sodium sesquicarbonate essentially in sodium carbonate. The sodium sesquicarbonate can have different origins. It can be produced artificially out of different sodium sources. However, it is recommended that sodium sesquicarbonate comes from a natural trona ore. In this recommended embodiment purification of the aqueous solution obtained after the dissolution of the solid powder in water will in general be necessary, in order to purify it from the main impurities contained in the ore. The purification generally involves settling and filtration steps, to allow insolubles to be removed from the aqueous solution. It may also involve generally the use of reagents in order to remove organic matters still contained in the purified aqueous solution. Activated carbon is an example of such reagent. In such instance, the purified aqueous solution having being subjected to settling and filtration may be passed through an activated carbon filter so as to remove some organics.

The water in which the solid powder derived from sodium sesquicarbonate is dissolved can be fresh water. However water has to be understood in a wide sense. The water can contain recycled water solutions already containing alkalis, coming from the process according to the invention or from other processes. The water can also comprise mother liquors (crystallization waters) produced downstream of the process according to the invention, when sodium carbonate and/or sodium bicarbonate are crystallized, for instance. The process may also be suited when at least part of the water used to dissolve sodium sesquicarbonate is a mine water. By 'mine water' is understood the aqueous solution which is formed when water is directly injected into a trona ore deposit, whereby, on contact with the water, some ore dissolves in it. 'Mine water' is typically produced during what is generally known as 'solution mining'.

The mean particle diameter of the ore powder which is dissolved in the water preferably is between 0.1 and 10 mm. Powders having a mean diameter below 0.1 mm frequently contain too many impurities, for instance when the sodium sesquicarbonate is a trona ore, whereas powders having a mean diameter above 10 mm tend to be difficult to handle and dissolve in water. The mean diameter is the $D_{50}$ which is the diameter such that half of the particles, in weight, have a diameter lower than the specified value. For non spherical particles, the diameter is the equivalent one, that is six times the value of the volume of the particles divided by its external area.

The powder which derives from sodium sesquicarbonate can consist essentially of sodium sesquicarbonate and the impurities accompanying it, as in the embodiment wherein the source of sodium sesquicarbonate is natural trona ore.

In a recommended embodiment of the reactive crystallization step in the process according to the present invention, the powder derived from sodium sesquicarbonate is calcined sodium sesquicarbonate. In this embodiment, the sodium sesquicarbonate is first calcined, preferably at a temperature comprised between 100 and 400° C., before its dissolution in water. During calcination, the sodium sesquicarbonate in the trona ore breaks down into sodium carbonate, carbon dioxide and water. Also, calcination releases some of the organics associated with trona or trona shale.

The quantity of powder derived from sodium sesquicarbonate which is dissolved into water is regulated in order to obtain a resulting aqueous solution containing enough sodium carbonate and bicarbonate to allow smooth crystallization of both chemicals in the later steps of the process. It is recommended that the resulting aqueous solution contains at least 15%, preferably at least 20%, most preferably at least 25% by weight of sodium carbonate.

The crystallization unit into which the resulting aqueous solution is introduced must be suitable to effect crystallization of sodium carbonate. The crystallized sodium carbonate may be in different hydration forms: monohydrate, decahydrate, heptahydrate, or may be anhydrous.

In a preferred embodiment of the process according to the present invention, the sodium carbonate crystals produced in the crystallization unit are in the monohydrate form. The crystallization unit is then part of what is commonly referred to as the "monohydrate crystallization unit" in a "monohydrate process". In the monohydrate process, crushed trona ore is calcined at a temperature between 125° C. and 250° C. to convert sodium bicarbonate into sodium carbonate and form crude soda ash. The resulting crude sodium carbonate and the remaining organics are then dissolved in water. After dissolving the calcined trona, any undissolved solids (insolubles) are removed by at least one separation technique such as by settling, and the resulting solution is treated with activated carbon to remove some of the organics present in the solution. The solution may be then filtered. One of the advantages of the monohydrate process is that calcined trona dissolves faster than natural trona (sometimes called 'raw' trona). Another advantage is that calcined trona can produce more concentrated sodium carbonate solutions, whose concentrations can reach about 30%, while dissolved natural trona results into solutions having only about 16% sodium carbonate plus 10% sodium bicarbonate. The filtered solution containing sodium carbonate is then fed to an evaporative crystallization unit where some of the water is evaporated and some of the sodium carbonate forms into sodium carbonate monohydrate crystals ($Na_2CO_3.H_2O$). A slurry (containing these monohydrate crystals and a mother liquor) is removed from the evaporators, and the crystals are separated from the mother liquor. The crystals are then calcined, or dried, to convert it to dense soda ash. The mother liquor may be recycled back to the evaporator circuit for further processing into sodium carbonate monohydrate crystals.

In the process according to the invention however, a portion of the mother liquor is purged from the sodium carbonate crystallization unit (hence termed 'monohydrate purge') to prevent accumulation of trona derived impurities, such as NaCl, $Na_2SO_4$, silicates, and/or organics. This monohydrate purge or at least a portion thereof preferably serves as the feed to the sodium bicarbonate production process which uses reactive crystallization. The composition of the monohydrate purge which is put into contact with carbon dioxide to manufacture the sodium bicarbonate product via reactive crystallization can vary according to the crystallization conditions. In general, it is recommended that the monohydrate purge contains a sufficient quantity of sodium carbonate.

Sodium Carbonate Liquor Feed to Reactive Crystallization Step

The feed liquor to the sodium bicarbonate reactive crystallization unit (a first crystallization unit in sequence) is advantageously at least a portion of a purge stream from a monohydrate crystallization unit, such purge stream being withdrawn from the monohydrate crystallization unit to maintain the concentration of impurities (such as chloride, sulfate, silicates, and/or TOC) in the crystallization unit below a threshold value (to prevent their accumulation in the crystallization unit). This liquor may also be termed a "monohydrate purge".

In a recommended embodiment of the process for sodium bicarbonate production according to the invention, the monohydrate purge contains at least 175 g/kg, preferably at least 190 g/kg, more preferably at least 205 g/kg, most preferably at least 220 g/kg of sodium carbonate. It is however recommended that the monohydrate purge contains not more than 300 g/kg, preferably not more than 280 g/kg of sodium carbonate.

It is also recommended that the monohydrate purge contains not more than 35 g/kg, preferably contains not more than 30 g/kg, more preferably contains not more than 25 g/kg, most preferably contains not more than 20 g/kg of sodium bicarbonate.

It is additionally recommended that the monohydrate purge contains from 3 to 6, preferably from 4 to 5 equivalent/kg total alkali content. This means that one kg of solution contains advantageously from 3 to 6, preferably from 4 to 5 moles of ion $Na^+$, whether coming from sodium carbonate or sodium bicarbonate.

In an advantageous embodiment of the process for sodium bicarbonate production of the invention, the monohydrate purge contains at least 10 g/kg, preferably at least 15 g/kg, most preferably at least 20 g/kg of sodium chloride (NaCl). It is however recommended in those advantageous embodiments that the monohydrate purge contains not more than 60 g/kg of sodium chloride, preferably not more than 50 g/kg of sodium chloride, preferably not more than 40 g/kg of sodium chloride.

In another advantageous embodiment of the sodium bicarbonate production process of the invention, the monohydrate purge contains at least 1 g/kg, preferably at least 4 g/kg, more preferably at least 7 g/kg of sodium sulfate ($Na_2SO_4$), most preferably at least 8 g/kg of $Na_2SO_4$. It is however recommended in this advantageous embodiment that the monohydrate purge contains not more than 25 g/kg $Na_2SO_4$, more preferably contains not more than 20 g/kg $Na_2SO_4$.

In still another advantageous embodiment of the sodium bicarbonate production process of the invention, the monohydrate purge contains at least 0.5 g/kg of Si, preferably at least 0.6 g/kg of Si, most preferably at least 1 g/kg of Si (counted as silica). It is however recommended in this advantageous embodiment that the monohydrate purge contains not more than 3 g/kg of silica, preferably contains not more than 1.5 g/kg of silica.

In still yet another advantageous embodiment of the sodium bicarbonate production process of the invention, the monohydrate purge contains at least 100 ppm total organics carbon (TOC), preferably at least 200 ppm TOC, most preferably at least 400 ppm TOC. It is however recommended in those advantageous embodiments that the monohydrate purge should not exceed 1600 ppm in TOC content, preferably should not exceed 1500 ppm TOC.

A typical monohydrate purge would contain for example from 108 ppm TOC to 1480 ppm TOC, with an average around 450 ppm TOC; preferably from 300 to 1200 ppm TOC. The NaCl content of the monohydrate purge would be on average about 2% ranging from 0.3% to 3.6%. The $Na_2SO_4$ content of the monohydrate purge would be on average about 1.6% ranging from 0.1% to 3.2%. The Si content of the monohydrate purge would range from 500 ppm to 3000 ppm Si (measured as silica).

Making Crystalline Sodium Bicarbonate Product Via Reactive Crystallization

In the reaction crystallization step in the sodium bicarbonate production process according to the invention, an aqueous solution comprising sodium carbonate (preferably a sodium carbonate-containing liquor; more preferably at least a portion of a monohydrate purge (monohydrate purge) is put into contact, in a reactive crystallization unit, with a feedgas comprising $CO_2$, in order to produce a water suspension comprising sodium bicarbonate crystals. The reactive crystallization unit preferably is a gas-liquid reactor.

The sodium carbonate in the monohydrate purge is preferably produced from calcined trona by the monohydrate process as described earlier.

The sodium bicarbonate production process preferably comprises:
  withdrawing a portion of the mother liquor out of the sodium carbonate crystallization unit as a monohydrate purge; and
  putting at least a portion of the monohydrate purge into contact with the feedgas comprising carbon dioxide, in order to produce a second water suspension comprising sodium bicarbonate crystals;
  separating particles containing said sodium bicarbonate crystals from the a second water suspension to generate a second purge stream; and
  drying said particles to form the sodium bicarbonate product.

The monohydrate purge which is put in contact with the $CO_2$-containing feedgas preferably contains organic impurities. The monohydrate purge may contain at least 100 ppm TOC, preferably at least 200 ppm TOC, most preferably at least 400 ppm TOC. It is however recommended in those advantageous embodiments that the monohydrate purge should not exceed 1600 ppm in TOC, preferably should not exceed 1500 ppm TOC.

The feedgas comprising carbon dioxide must react efficiently with the sodium carbonate-containing purge liquor in a reactive crystallization unit. To that end, it is recommended that the feedgas comprises at least 20% in weight, advantageously at least 40%, preferably at least 60%, more preferably at least 80% $CO_2$. It is particularly efficient to use pure (100%) $CO_2$. It is also recommended to use a well stirred gas-liquid reactor (as the reactive crystallization unit), comprising a gas injector able to distribute the feedgas homogeneously into the reactor. The liquid constitutes advantageously the continuous phase inside the reactor, the feedgas being injected at the bottom and moving upwards. The reactor preferably comprises cooling means, to counteract the exothermicity of the reaction of sodium carbonate with $CO_2$.

The $CO_2$ in the feedgas may have different origins. In one recommended embodiment, the $CO_2$ may originate from natural gas separation or from combustion of one or more hydrocarbonaceous material such as in a natural gas plant, after having been concentrated for example through an amine process. In the reactive crystallization step for the production of sodium bicarbonate according to the invention, the gas comprising $CO_2$ may be produced by indirect calcination of a composition releasing $CO_2$ upon calcination, preferably a composition comprising an alkali bicarbonate, more preferably sesquicarbonate or trona. Preferably, the $CO_2$ in the feedgas comes from the monohydrate process which makes soda ash, for instance $CO_2$ generated in calciners used to calcine trona ore. Calcination of trona is advantageously operated between 140° C. and 180° C. By indirect calcination is meant calcination wherein the composition to be calcined is not in direct contact with the heat source utilized to warm the calciner. This is indeed the situation in conventional calciners, wherein the composition is in direct contact with the combustion gases produced by the burning fuel. In this embodiment, it is recommended to use steam heated calciners, wherein the steam is circulated into pipes, and the composition, preferably crushed trona ore, is heated by contact with the exterior surface of the pipes. The steam is advantageously produced by electricity and steam cogeneration. It has been observed that the gas comprising $CO_2$ which is produced in this way, after suitable drying for instance by a condensing step, has an elevated concentration in $CO_2$, typically more than 80% in volume, preferably more than 90%, most preferably more than 95%. The $CO_2$ has also a great purity. Thanks to those properties, a feedgas comprising $CO_2$ produced that way is especially suitable for the production of sodium bicarbonate out of an aqueous solution comprising sodium carbonate.

Consequently, the process for the production of sodium bicarbonate may further comprise a step in which a composition releasing $CO_2$ upon calcination is indirectly calcined in order to produce at least a portion of the feedgas comprising $CO_2$.

Alternatively or additionally, the process for the production of sodium bicarbonate may further comprise a step in which a hydrocarbonaceous composition releasing $CO_2$ upon combustion is burned to produce heat in order to produce at least a portion of the feedgas comprising $CO_2$.

The temperature inside the reactive crystallization unit may be between 60 and 85° C., or between 65 and 80° C. The temperature inside the reactive crystallization unit is preferably between 65 and 85° C., more preferably between 70 and 80° C. The temperature of the monohydrate purge when it is introduced into the reactor may be between 65° C. and 95° C. The temperature of the monohydrate purge is advantageously a little higher (e.g., at least 5° C. higher) than the reactor temperature, preferably between 80 and 95° C.

The operating pressure inside the reactive crystallization unit may be from atmospheric pressure up to 90 psia (from 101 to 9,120 kPa). It is preferable for the operating pressure to be at least slightly above atmospheric pressure, such as between 1.02 and 2 atmospheres (between 15 and 29.4 psia; or between 103 and 203 kPa). The operating pressure is more preferably between 17 psia and 27 psia (between 117 and 186 kPa).

In order to obtain a water suspension comprising enough sodium bicarbonate crystals, it is preferable to maintain a residence time in the reactive crystallization unit greater than 10 minutes, more preferably greater than 20 minutes. Generally, the liquid residence time may be from 60 to 600 min, preferably from 120 to 420 minutes, more preferably from 180 to 360 minutes.

Optional Use of Crystal Modifier Additive

In preferred embodiments of the various aspects of the present invention, a crystal modifier additive is used during crystallization to make sodium bicarbonate crystals, such as in the cooling crystallization unit to make the second sodium bicarbonate crystals and/or in the reactive crystallization unit to make the first sodium bicarbonate crystals. The at least one crystal modifier additive is present in the crystals slurry inside the cooling crystallization unit or in a suspension in the reactive crystallization unit to make sodium bicarbonate crystals.

The crystal modifier additive may also be called "crystal habit modifier" or "crystallization-modifying agent".

In some embodiments, a crystal modifier additive may be added to the sodium carbonate-containing aqueous solution to be fed to the reactive crystallization unit used for the reactive crystallization step or may be added directly to the reactive crystallization unit.

When a crystal modifier additive is used in a crystallization step, the at least one crystal modifier additive may comprise an additive selected from the group consisting of:
 an alkali metal salt,
 phosphates,
 phospholipids,
 carboxylates,
 carboxilic acids,
 anionic hexametaphosphate,
 anionic polyphosphate,
 anionic polyphosphonate,
 soy lecithin,
 citric acid,
 anionic polycarboxylate polymer,
 anionic polyacrylate polymer,
 anionic polyacrylate-polyacrylamide co-polymer,
 anionic hydrolyzed polymaleic polymers,
 anionic maleic-acrylic acids copolymers,
 anionic acrylic acid-phosphonic acid copolymers,
 sulfates,
 sulfonates,
 polysulfonates,
 amines (for example, quarternary amines),
 hydroysultaines,
 polycarboxylates,
 polysaccharides,
 polyethers and ether-phenols,
 alkali metal hexametaphosphate,
 sulfosuccinates,
 amidosulfonates,
 amine sulfonates, and
 any combination of two or more thereof.

In some embodiments in which the crystal modifier additive is used in the cooling crystallization step, a crystal modifier additive may be added to the sodium bicarbonate-containing liquor to be fed to the cooling crystallization unit (either in the liquor stream feeding the cooling crystallization unit or in a holding tank in which the liquor is stored before being fed to the cooling crystallization unit), added to the slurry in the cooling slurry circulation loop (which includes the cooling heat exchanger), and/or added directly to the cooling crystallization unit.

In some embodiments in which the crystal modifier additive is used in the reactive crystallization step, a crystal modifier additive may be added to the sodium carbonate-containing liquor to be fed to the reactive crystallization unit (either in the liquor stream feeding the reactive crystallization unit or in a holding tank in which the liquor is stored before being fed to the reactive crystallization unit) and/or added directly to the reactive crystallization unit.

Examples of suitable crystallization-modifying additives may be found for example in WO2011/161120A1 (or U.S. Pat. No. 8,865,096), WO2013/092754A1 (or US2015/037583), WO2014/207120A2, WO2014/207123A2, and WO2014/207124A2, all by SOLVAY SA, each of which is incorporated herein by reference.

In WO2011/161120A1, the crystal modifier additive may be selected from the group consisting of: phosphates, phospholipids, carboxylates, carboxilic acids, and combinations thereof. In particular, the additive may be selected from the group consisting of: anionic hexametaphosphate, anionic polyphosphate, anionic polyphosphonate, soy lecithin, citric acid, anionic polycarboxylate polymer, anionic polyacrylate polymer, anionic polyacrylate-polyacrylamide copolymer, and combinations thereof. In more particular, the additive may be selected from the group consisting of: sodium polyacrylate polymer, ammonium polyacrylate polymer, sodium polyacrylate-polyacrylamide co-polymer, ammonium polyacrylate-polyacrylamide co-polymer, and combinations thereof. Preferably, the additive may have a molecular weight of at least 20 000, preferably at least 30 000, more preferably at least 40 000, and/or at most 200 000, preferably at most 150 000, more preferably at most 120 000.

In WO2013/092754A1, the additive may be selected from the group consisting of: anionic hexametaphosphate, anionic polyphosphate, anionic polyphosphonate, soy lecithin, anionic polycarboxylate polymer, anionic polyacrylate polymer, anionic polyacrylate-polyacrylamide co-polymer, anionic hydrolyzed polymaleic polymers, anionic maleicacrylic acids copolymers, anionic acrylic acid-phosphonic acid copolymers and combinations thereof. In particular, the additive may be selected from the group consisting of: anionic polyacrylate polymer, anionic polyacrylate-polyacrylamide co-polymer, anionic maleic-acrylic acids copolymers, anionic acrylic acid-phosphonic acid copolymers and combinations thereof, preferably an anionic polyacrylate polymer.

WO2014/207120A2 relates to a method for preparing alkali metal bicarbonate particles by crystallization from an alkali metal carbonate and/or bicarbonate solution with an additive present in the solution, selected from the group consisting of: sulfates, sulfonates, polysulfonates, amines, hydroysultaines, polycarboxylates, polysaccharides, polyethers and ether-phenols, alkali metal hexametaphosphate, phosphates, sulfosuccinates, amidosulfonates, amine sulfonates, preferably selected from the group consisting of polysaccharides. The additive is present in the solution at a concentration of at least 1 ppm and preferably at most 200 ppm When a crystallization-modifying agent is used in the reactive crystallization step, the additive preferably contains Ca and/or Mg.

When a crystallization-modifying agent is used in the cooling crystallization step, the additive preferably contains Ca.

The formation of the sodium bicarbonate crystals preferably takes place in the presence of an added alkaline earth metal salt. An alkaline earth-containing salt, such as containing Ca and/or Mg, may be added to the monohydrate purge fed to the reactive crystallization unit or may be added directly to the reactive crystallization unit while the monohydrate purge is separately fed to the reactor. A study on the "Influence of calcium ions on the crystallization of sodium bicarbonate" can be found in the article by Yi ZHU et al., Journal of Crystal Growth vol. 275 (2005), pages 333-339, which is incorporated herein by reference.

A calcium compound (such as a calcium salt) may be used during the formation of sodium bicarbonate crystals. A preferred Ca-containing salt to be used as crystallization-modifying agent is calcium chloride. An aqueous solution of calcium chloride is preferred, such as a 30% by weight calcium chloride aqueous solution. The addition of Ca may be carried to change the mean particle size, in that the greater the amount of Ca in the slurry in the cooling crystallization unit or in a suspension in the reactive crystallization unit (gas-liquid reactor), the greater the particle size of sodium bicarbonate.

When calcium is used as a crystal modifier additive in the reactive crystallization step to make the first sodium bicarbonate crystals, calcium may be added to reach an amount from 30 mg to 200 mg Ca per kg of first sodium bicarbonate crystals produced, preferably from 50 to 180 mg Ca per kg first sodium bicarbonate particles produced, more preferably from 70 to 110 mg Ca per kg first sodium bicarbonate crystals produced.

When calcium is used as a crystal modifier additive in the cooling crystallization step to make the second sodium bicarbonate crystals, calcium may be added to reach an amount from 150 mg to 500 mg Ca per kg of second sodium bicarbonate crystals produced, preferably from 180 to 450 mg Ca per kg of second sodium bicarbonate particles produced, more preferably from 200 to 425 mg Ca per kg of second sodium bicarbonate particles produced, most preferably from 300 to 400 mg Ca per kg of second sodium bicarbonate particles produced.

In some embodiments, the process excludes adding exogenous magnesium to the monohydrate purge containing sodium carbonate or to the suspension in the reactive crystallization unit. A content of Mg in the aqueous solution containing sodium carbonate or to the suspension of less than 15 ppm is preferred.

In some embodiments, the process excludes adding exogenous magnesium to the reactive crystallization purge containing sodium bicarbonate being fed to the cooling crystallization unit, or to the cooling circulation loop hydraulically connected with the cooling crystallization unit, or to the crystal slurry in the cooling crystallization unit.

Post-Reactive Crystallization Step(S)

In preferred embodiments of the process according to the present invention, the post-reactive crystallization step(s) may include:

separation of solids from at least a portion of the crystal slurry withdrawn from the reactive crystallization unit to recover solids, and subjecting the solids recovered from the reactive crystallization step to at least one step selected from the group consisting of:

drying at least a portion of the solids recovered from the reactive crystallization step, calcining at least a portion of the solids recovered from the reactive crystallization step, mixing at least a portion of the solids recovered from the reactive crystallization step with at least a portion of solids recovered from a cooling crystallization step;

subjecting at least a portion of the solids recovered from the reactive crystallization step to a caustic treatment;

adding at least a portion of the solids recovered from the reactive crystallization step to a cooling crystallization unit, mixing at least a portion of the solids recovered from the reactive crystallization step with a sodium carbonate feed to a cooling crystallization unit, and any combination of two or more of these steps.

When a post-crystallization step includes the separation of solids from the crystals slurry to recover solids from the reactive crystallization step, the separation of solids may comprise passing at least a portion of the crystals magma through at least one separation unit to recover solids from the reactive crystallization step.

The separation unit may comprise any suitable solid-liquid separation unit which is capable of separating the solids from the liquid phase in the crystals slurry, such as settling, centrifugation, filtration, or by any combination of these separating means.

The separation unit may comprise for example at least one cyclone, at least one centrifuge, at least one filter, or any combinations thereof. Preferably, the separation unit may comprise at least one cyclone in series with a centrifuge; that is to say, the separation unit may comprise at least one cyclone from which a solids-enriched stream exiting the at least one cyclone is fed to at least one centrifuge. The separation step generally forms a clarified stream. The clarified stream is lean on solids, in that its solid content is much less than that of the crystal slurry being fed to the separation step.

At least a portion of this clarified stream is purged from the reactive crystallization unit and may be termed the 'reactive crystalizer purge'. At least a part of the 'reactive crystalizer purge' may be recycled in the process according to the invention and may serve, at least in part, as a feed to the cooling crystallization unit. A portion of the clarified stream which is not used in the cooling crystallization unit may be sent to a waste (or tailings) ponds.

When the crystal sizes produced in the reactive crystallization unit are large enough to be of suitable size for making a salable product, the separation of solids from the crystal slurry is generally carried out. The crystalline sodium bicarbonate solids are finally dried to form a first particulate sodium bicarbonate product. The first particulate sodium bicarbonate product may be packed into bags or sacks and/or may be loaded into railcars.

When the crystal sizes produced in the reactive crystallization unit are not large enough to be of suitable size for making a salable product, the separation of solids from the crystal slurry may be omitted and the crystal slurry recycled to another crystallization unit to allow for the crystals to grow more. Generally though, the separation of solids from the crystal slurry is carried out either before recycling to another crystallization unit or before being subjected to a caustic treatment.

The caustic treatment may comprise adding a caustic additive to the slurry or wet solids stream. The caustic additive may include a hydroxide compound. The caustic additive may comprise or consist of lime and/or sodium hydroxide.

In preferred embodiments of the reactive crystallization step in this process, the monohydrate purge comprising sodium carbonate may comprise at least 175 g/kg of sodium carbonate, and the gas comprising $CO_2$ comprises at least 90% $CO_2$.

In some embodiments, the first sodium bicarbonate product made from the reactive crystallization step may not be subjected to sieving in order to remove fines (e.g., solid particles of less than 45 microns or of US mesh size of 325 or more) and/or to remove large particles (e.g., solid particles of more than 300 microns of less than a US mesh size 50).

In additional or alternate embodiments, the final sodium bicarbonate product made from the reactive crystallization step may not be subjected to a grinding or milling operation which would impact its particle size distribution and/or particle shape.

According to the present invention, different variants of the process and/or of the product(s) obtained by said variants of the process are described in more detail below.

ITEM 1: A process for producing crystalline sodium bicarbonate, comprising:
  providing an aqueous sodium-bicarbonate containing liquor originating from a reactive crystallization step in which first sodium bicarbonate crystals are produced and recovered;
  subjecting at least a portion of said aqueous sodium-bicarbonate containing liquor to at least one cooling crystallization step to produce a slurry comprising second sodium bicarbonate crystals; and
  separating said second sodium bicarbonate crystals from said slurry to recover second sodium bicarbonate crystals.

ITEM 2: The process according to ITEM 1, further comprising:
  after the separation step, drying at least a portion of recovered second sodium bicarbonate crystals and separately drying at least a portion of recovered first sodium bicarbonate crystals to make two separate sodium bicarbonate products.

ITEM 3: The process according to ITEM 1, further comprising:
  mixing at least a portion of said second sodium bicarbonate crystals with at least a portion of said first sodium bicarbonate crystals; and
  drying the resulting mixture to produce a sodium bicarbonate product.

ITEM 4: The process according to ITEM 1, further comprising:
  calcining at least a portion of recovered second sodium bicarbonate crystals to produce soda ash.

ITEM 5: The process according to ITEM 1, further comprising:
  subjecting at least a portion of recovered second sodium bicarbonate crystals to a caustic step to convert sodium bicarbonate to sodium carbonate.

ITEM 6: The process according to ITEM 1, wherein the step for providing an aqueous sodium-bicarbonate containing liquor originating from a reactive crystallization step comprises:
  providing a sodium carbonate bearing stream, at least a portion of which is generated by a sodium carbonate crystallization unit; and
  bicarbonating the sodium carbonate bearing stream with a gas comprising $CO_2$ to produce an aqueous suspension comprising said first sodium bicarbonate crystals and further to produce at least a portion of said aqueous sodium-bicarbonate containing liquor which is fed to said at least one cooling crystallization unit.

ITEM 7: The process according to ITEM 1, further comprising adding at least a portion of recovered second sodium bicarbonate crystals directly to the reactive crystallization unit from which said aqueous sodium-bicarbonate containing liquor originates, and/or to the portion of said sodium carbonate bearing stream which is fed to the reactive crystallization unit.

ITEM 8: The process according to ITEM 1, further comprising adding at least one crystal modifier additive in the portion of said sodium carbonate bearing stream prior to being subjected to the reactive crystallization step or adding said crystal modifier additive directly to a reactive crystallization unit in said reactive crystallization step.

ITEM 9: The process according to ITEM 6, wherein fine particles are present in said portion of said sodium carbonate bearing stream; and wherein mixing at least a portion of recovered second sodium bicarbonate crystals with the portion of said sodium carbonate bearing stream which is subjected to the reactive crystallization step results in increasing the temperature of the resulting combined stream to dissolve said fine particles.

ITEM 10: The process according to ITEM 1, further comprising performing at least one of the following steps selected from the group consisting of:
- adding at least one crystal modifier additive in said portion of the aqueous sodium bicarbonate-containing liquor prior to being subjected to the cooling crystallization step;
- adding said crystal modifier additive directly to a cooling crystallization unit in said cooling crystallization step; and
- adding said crystal modifier additive to a cooling circulation loop.

ITEM 11: The process according to ITEM 8 or 10, wherein the at least one crystal modifier additive comprises Ca.

ITEM 12: The process according to ITEM 11, wherein calcium is added to reach an amount from 30 mg to 200 mg Ca per kg of sodium bicarbonate crystals produced.

ITEM 13: The process according to ITEM 8 or 10, wherein the at least crystal modifier additive comprises an additive selected from the group consisting of:
- an alkali metal salt;
- phosphates,
- phospholipids,
- carboxylates,
- carboxilic acids,
- anionic hexametaphosphate,
- anionic polyphosphate,
- anionic polyphosphonate,
- soy lecithin,
- citric acid,
- anionic polycarboxylate polymer,
- anionic polyacrylate polymer,
- anionic polyacrylate-polyacrylamide co-polymer,
- anionic hydrolyzed polymaleic polymers,
- anionic maleic-acrylic acids copolymers,
- anionic acrylic acid-phosphonic acid copolymers,
- sulfates,
- sulfonates,
- polysulfonates,
- amines (for example, quarternary amines),
- hydroysultaines,
- polycarboxylates,
- polysaccharides,
- polyethers and ether-phenols,
- alkali metal hexametaphosphate,
- sulfosuccinates,
- amidosulfonates,
- amine sulfonates, and
- any combination of two or more thereof.

ITEM 14: The process according to ITEM 8 or 10, wherein the at least one crystal modifier additive comprises a quarternary amine.

ITEM 15: The process according to ITEM 1, wherein said separation of the slurry is carried out in a same separation step in which the first sodium bicarbonate crystals are recovered, so that this separation step recovers the first sodium bicarbonate crystals from a reactive crystallization step and the second sodium bicarbonate crystals from the cooling crystallization step.

ITEM 16: The process according to ITEM 1, wherein at least a portion of the recovered second sodium bicarbonate crystals are directed to a reactive crystallization step in order for these crystals to grow in size.

ITEM 17: The process according to ITEM 1, wherein the at least one cooling crystallization step produces an overflow which is lean in crystal content, and wherein at least a portion of said overflow is directed to a tailings pond.

ITEM 1: The process according to ITEM 1, wherein the at least a portion of said aqueous sodium-bicarbonate containing liquor is subjected to at least one cooling crystallization step in a baffled cooling crystallization unit comprising a crystal settling zone and a crystal magma zone.

The process of the present invention can be illustrated by reference to the operations and flow streams depicted schematically in FIG. 1.

FIG. 1 represents a system for producing sodium bicarbonate which comprises a feed tank 10, a sodium bicarbonate cooling crystallization unit 'CZ1' 20, a slurry cooling circulation loop 128 comprising a cooling heat exchanger 30, and a slurry separation loop 118 comprising a separation unit 40. The cooling crystallization unit 'CZ1' 20 is hydraulically connected to the feed tank 10, to the slurry cooling circulation loop 128 and to the slurry separation loop 118.

A sodium bicarbonate containing purge liquor 100 is stored in feed tank 10. The sodium bicarbonate containing purge liquor 100 preferably comprises or consists of a purge exiting a reactive crystallization step. A purge stream 105 of the purge liquor 100 is withdrawn from tank 10 and is directed to the sodium bicarbonate cooling crystallization unit 20 into, most usually, the slurry cooling circulation loop 128. It is preferred that the flowing of the purge stream 105 to the sodium bicarbonate cooling crystallization unit 20 be gravity driven. But a pump may be used to flow the purge stream to cooling crystallization unit 20.

When the withdrawn purge stream 105 of the purge liquor 100 contains fines (e.g., solids with a particle size of 45 microns or less, or of a US mesh size of 325 and more), the purge stream 105 may be passed through an optional pre-heating unit 'HX' 35 (shown in dashed line in FIG. 1) to increase its temperature to a value sufficient to dissolve these fines before the preheated purge stream 105 is directed to the cooling crystallization unit 20. The temperature of the purge stream 105 may be increased by at least 5 F, preferably at least 8 F.

Feed 110 to the cooling crystallization unit 20 comprises the optionally-preheated purge stream 105 and a cooled slurry stream 125 exiting the cooling exchanger 30.

A crystal slurry stream 115 is withdrawn from the cooling crystallization unit 20, generally at the bottom of such unit. At least a portion 120 of the withdrawn crystal slurry stream 115 exiting a cooling crystallization unit 20 flows through a cooling exchanger 30 in which the temperature of the circulated slurry stream is reduced by a cooling fluid 140, generally water. The cooling exchanger 30 is preferably an indirect shell-and-tube exchanger.

The flow through streams 115, 116, 119 represents the slurry separation loop 118. The portion 116 of the crystal slurry stream 115 which is withdrawn from unit 20 but not directed to circulate in the cooling circulating loop 128 is directed to a separation unit 40 in the separation loop 118. Both flows in these loops are preferably facilitated by one or more pumps.

The separation unit 40 may comprise any suitable solid-liquid separation unit which is suitable to separate the solids from the liquid phase in the crystal slurry stream. The separation unit may comprise for example at least one cyclone, at least one centrifuge, at least one filter, at least one settling tank, or any combination of two or more thereof.

Preferably, the separation unit 40 may comprise at least one cyclone in series with a centrifuge; that is to say, a solids-enriched stream exiting the at least one cyclone is fed to at least one centrifuge for the solids to be further separated.

In some embodiments, the solids-enriched stream 180 exiting the separation unit 40 is a solids cake or a thickened slurry enriched in solids content compared to portion 116 of crystal slurry stream 115.

This solids-enriched stream 180 is generally fed to a post-crystallization unit such as a drying unit, a calcining unit, a caustic treatment unit, a sodium bicarbonate reactive crystallizing unit, or combinations thereof.

In some embodiments, a clarified stream 119 exits the separation unit 40. The clarified stream 119 is preferably directed back to the cooling crystallization unit 'CZ1' 20. In preferred embodiments, the clarified stream 119 represents an overflow of at least one cyclone in the separation unit 40. The clarified stream 119 may contain up to 5 wt % solids, preferably from 0.5 to 4 wt % solids. These solids may have a small particles size. In the event that the solid particles sizes in the clarified stream 119 is low enough that it may impact negatively the crystals already present in the crystal slurry inside the crystallization unit, the clarified stream 119 (or a portion thereof) may be passed through a heat exchanger to increase its temperature so as to dissolve the small solid particles before being directed to the cooling crystallization unit 'CZ1' 20.

In some embodiments, the separation unit 40 may comprise at least one filter, such as at least one rotary vacuum filter, to generate the stream 180.

In alternate embodiments, the separation unit 40 may comprise at least one settling tank (thickener) instead of hydrocyclone(s). The settling tank in unit 40 could be used to thicken the slurry to a concentration as high as a hydrocyclone could produce in order to generate stream 180.

The portion 116 of the crystal slurry stream 115 is separated via the separation unit 40 into a solids-enriched stream 180 and a clarified stream 119. The clarified stream 119 has a solids content less than the portion 116 of crystal slurry stream 115. At least part of, or the totality of, the clarified stream 119 is recycled to the cooling crystallization unit 20. If a portion of the solids lean stream 119 which is not recycled to the cooling crystallization unit 20, such portion may be send to a tailings pond (not illustrated). Water or an aqueous stream may be added to this portion of the solids lean stream 119 sent to the pond, for example to help with the fluid viscosity and/or to prevent plugging of lines and tanks.

The flow through streams 115, 120, 125, 110 represents the slurry circulation loop 128. The cooled circulation stream 125 is mixed with the optionally-preheated purge stream 105 to form the feed 110 before it enters the cooling crystallization unit 20.

Figure 2:
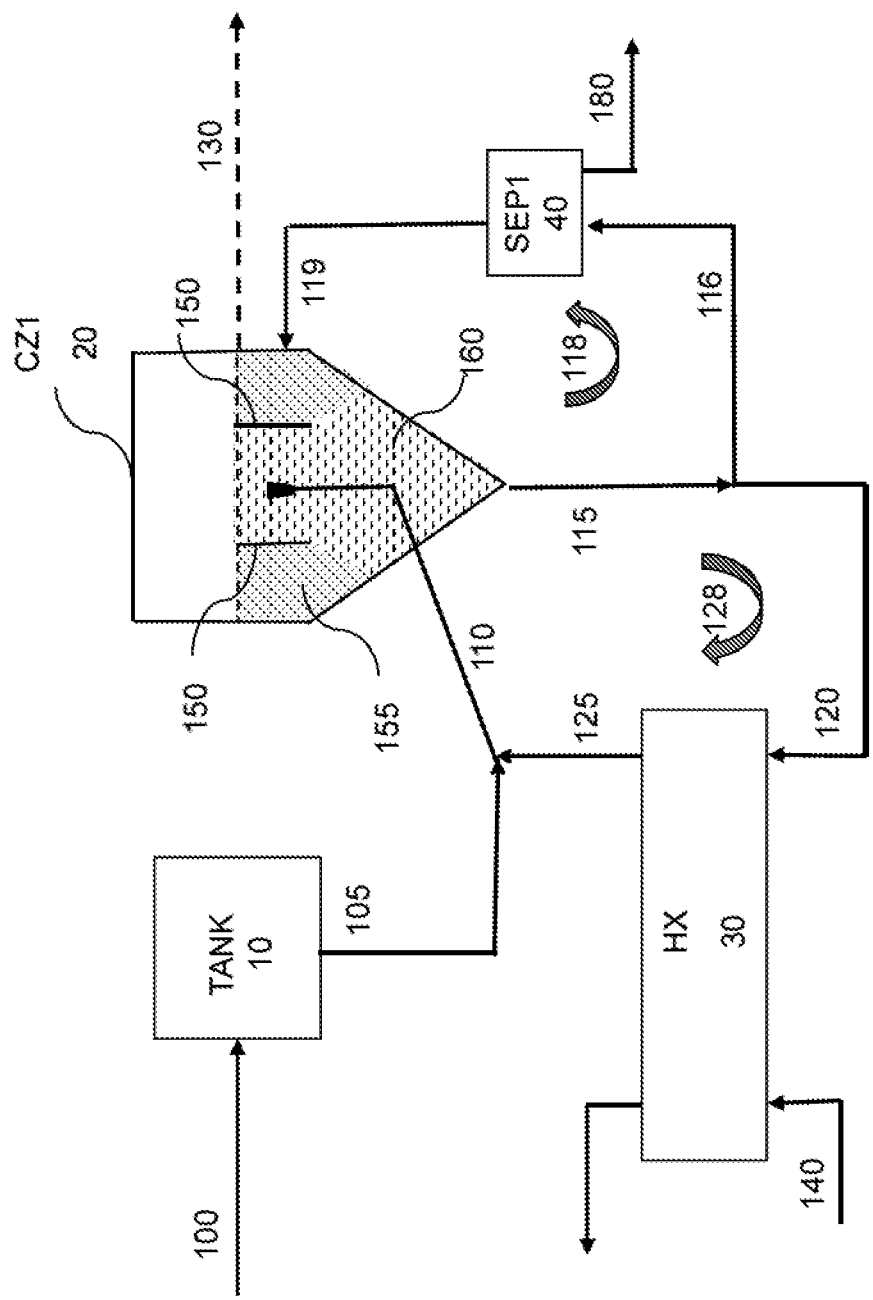
FIG. 2 illustrates a simplified process flow diagram for a sodium bicarbonate production process according to another embodiment of the present invention which is similar to FIG. 1, except that this process uses an optional pre-heater for a purge exiting a reactive crystallization unit and the cooling crystallization unit is baffled and comprises at least one crystal setting zone.

The cooling crystallization unit 20 may be any one of several types available commercially. As illustrated in FIG. 2, the cooling crystallization unit 20 may be baffled with one or more internal baffles 150. The one or more internal baffles 150 are preferably vertical, although they could also be slanted with an angle from the vertical, and extend from the top of the cooling crystallization unit 20 down to part ways into the crystal magma. The one or more internal baffles preferably do not reach the bottom of the cooling crystallization unit 20. The placement of the one or more baffles inside the cooling crystallization unit 20 is such that they partially divide the volumetric space taken by the crystal slurry inside the cooling crystallization unit 20 into the two zones: the crystal magma zone 160 and the crystal settling zone 155. The crystal magma zone 160 is generally located at the center of the cooling crystallization unit 20, while the crystal settling zone 155 surrounds at least the top portion of this crystal magma zone 160 inside the cooling crystallization unit 20 and is at the periphery of the cooling crystallization unit 20.

As shown in FIG. 2, the sodium bicarbonate containing feed 110 enters the crystal magma zone 160 in the cooling crystallization unit, preferably by way of a draft tube with a vertical portion at its downstream end, such that the feed 110 flows upwards into such vertical portion of the draft tube and exits the draft tube in the top portion of the crystal magma zone 160. The sodium bicarbonate containing feed 110 preferably exits the draft tube via a frustoconical end at the extremity of the draft tube vertical portion located in the crystal magma zone 160 at an elevation higher than the bottom of the baffle(s) 150.

On the periphery of the crystal magma zone 160 behind the baffled area in the crystallization unit 20, a slow upward flow of crystal magma enters the crystal settling zone 155. The upward velocity of this crystal magma should be low enough in order for the crystals to fall back into the crystal magma zone 160 enriching the crystal density in the crystal magma near the bottom of the cooling crystallization unit 20. As shown in FIGS. 1 and 2, a portion of the rising clarified slurry in the settling zone 150 is withdrawn as an overflow 130 from the settling zone 150. At least a portion or all of this overflow 130 is generally sent to a tailings pond (not illustrated). Water or an aqueous stream may be added to this overflow 130 or portion thereof sent to the pond, for example to help with the fluid viscosity and/or to prevent plugging of lines and tanks.

Figure 3:
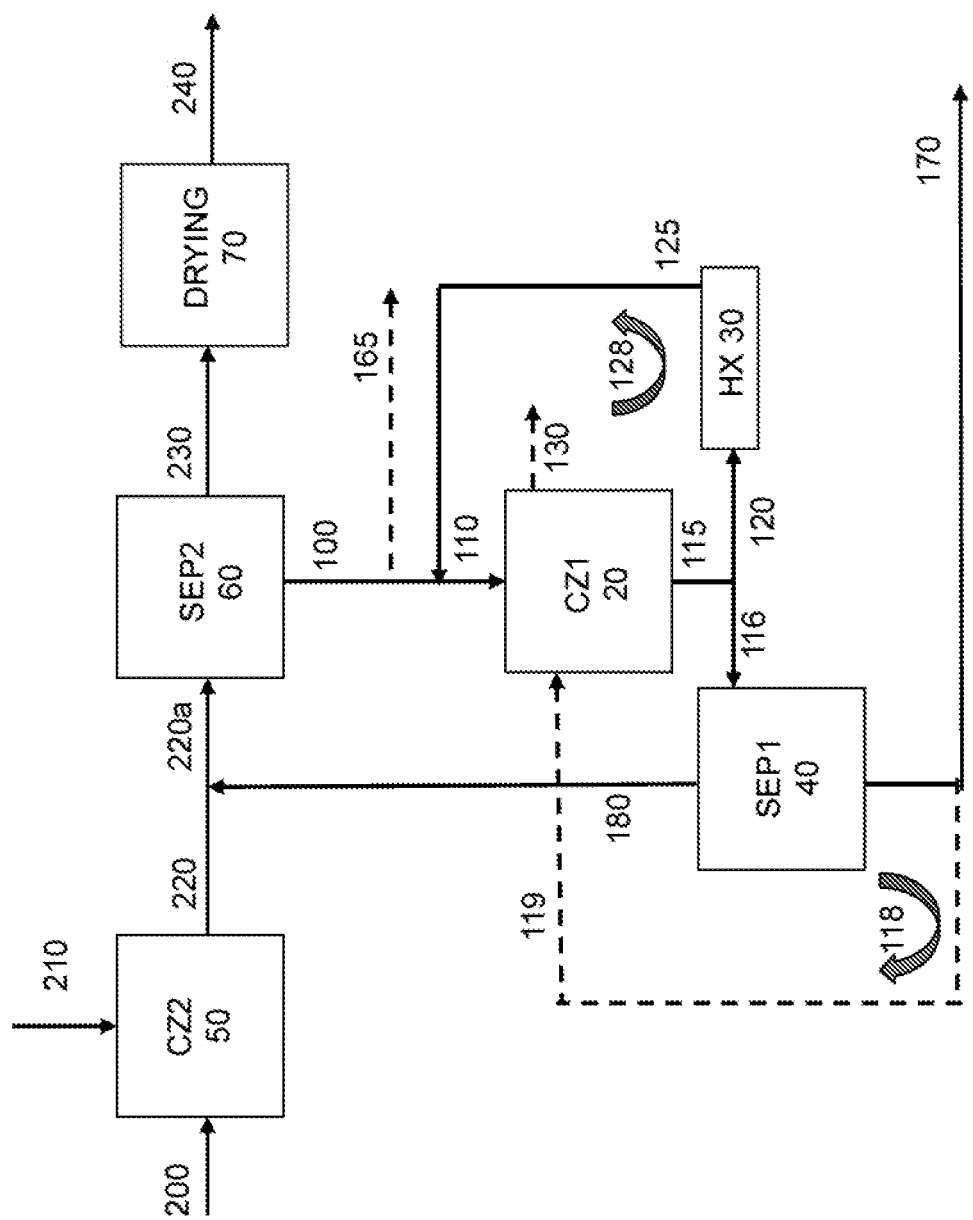
FIG. 3 illustrates a simplified process flow diagram for a sodium bicarbonate production process according to an embodiment of the present invention using sequential reactive and cooling crystallization steps, wherein a purge from the reactive crystallization step serves as a feed to the cooling crystallization step and wherein the sodium bicarbonate crystals obtained from the cooling crystallization step are mixed at least in part to sodium bicarbonate crystals obtained from the reactive crystallization step to form one sodium bicarbonate product.

FIG. 3 illustrates a simplified process flow diagram for a sodium bicarbonate production process according to an embodiment of the present invention using sequential reactive and cooling crystallization steps. The system for producing sodium bicarbonate in this embodiment in FIG. 3 comprises the sodium bicarbonate cooling crystallization unit 'CZ1' 20, the slurry cooling circulation loop 128 comprising the cooling exchanger 'HX' 30, and the slurry separation loop 118 comprising the separation unit 'SEP1' 40 as described previously in connection to FIG. 1. The cooling crystallization unit 'CZ1' 20 is hydraulically connected to the slurry cooling circulation loop 128 and to the slurry separation loop 118. For simplicity, the feed tank 10 and the optional pre-heating unit 35 shown in FIG. 1 has not been illustrated in FIG. 3. The difference between FIG. 1 and FIG. 3 is that the system in FIG. 3 further includes equipment for carrying out the reactive crystallization step such as a sodium bicarbonate reactive crystallization unit 'CZ2' 50, a separation unit 'SEP2' 60, and a drying unit 70.

In the operation of FIG. 3, a purge from a reactive crystallization step serves as a feed to the cooling crystallization step and the sodium bicarbonate crystals obtained from the cooling crystallization step are mixed at least in part to sodium bicarbonate crystals obtained from the reactive crystallization step to form one sodium bicarbonate product.

A sodium carbonate containing liquor 200 and a carbon dioxide-containing feedgas 210 are fed to the reactive crystallization unit CZ2 50. Sodium carbonate is carbonated in the reactive crystallization unit CZ2 50 with carbon dioxide. An aqueous suspension 220 comprising crystalline sodium bicarbonate particles is extracted from the the reactive crystallization unit CZ2 50.

In an embodiment illustrated in FIG. 3, the process further comprises mixing at least a portion of the solids-enriched slurry stream 180 which exits the separation unit 'SEP1' 40 and which is recovered from the cooling crystallization unit CZ1 20 with at least a portion of the aqueous suspension 220 comprising crystalline sodium bicarbonate particles which exits the reactive crystallization unit CZ2 50. The resulting mixture 220a is preferably directed to the separation unit 'SEP2' 60 to provide wet solids 230 which are then dried in the drying unit 70 to provide a sodium bicarbonate product 240.

The separation unit 60 may comprise one or more cyclones, one or more centrifuges, one or more filters, or any combinations thereof. In some embodiments, the separation unit 60 preferably comprises at least one cyclone. The separation unit 60 more preferably comprises at least one cyclone in series with at least one centrifuge.

In some embodiments, the solids-enriched slurry stream 180 exiting the separation unit 40 (preferrably comprising at least one cyclone) is a thickened slurry enriched in solids content compared to portion 116 of crystal slurry stream 115. This thickened slurry is then mixed with the aqueous suspension 220 comprising crystalline sodium bicarbonate particles exiting the reactive crystallization unit 50 to form the mixture 220a fed to the separation unit 'SEP2' 60 and then to the drying unit 70.

In some embodiments, a clarified stream 170 exits the separation unit 40 (preferrably comprising at least one cyclone). A portion of, or all of, this clarified stream 170 preferably comprises the final purge of the process. A portion 119 of this clarified stream 170 may be directed back to the cooling crystallization unit 'CZ1' 20. In preferred embodiments, the clarified stream 170 represents an overflow of at least one cyclone in separation unit 40.

In some embodiment not illustrated in FIG. 3, at least a portion of the solids-enriched slurry stream 180 bypasses the separation unit 'SEP2' 60 (and thus not being sent to the separation unit 60), but rather is sent directly to the drying unit 70. In such embodiment, the separation unit 40 may comprise at least one filter, such as at least one rotary vacuum filter, to generate the solids-enriched slurry stream 180 which could be fed directly to the drying unit 70, bypassing the separation unit 60 (not illustrated).

In alternate embodiments, the separation unit 40 may comprise at least one settling tank (thickener) instead of hydrocyclone(s). The settling tank in unit 40 could be used to thicken the slurry to a concentration as high as a hydrocyclone could produce in order to generate solids-enriched slurry stream 180 which feeds the separation unit 60.

A purge liquor 100 exits the separation unit 60. Most of, or all of, the purge 100 is mixed in with the cooled slurry stream 125 exiting the cooling exchanger HX 30 to the purge stream 12. Or in some embodiments, most of the purge 100 may be fed directly to crystallization unit 20 (not illustrated). Optionally, a portion 165 of the purge liquor 100—shown in dashed line in FIG. 3, which is not fed to the cooling crystallization unit CZ2 20 may be directed to a tailings pond (not illustrated).

Additionally or alternatively, although not illustrated, another portion of the purge liquor 100 may be debicarbonated with vapor in a debicarbonation unit before the purge liquor 100 may be sent to a waste (tailings) pond. At least a portion of the carbon dioxide which would be obtained from debicarbonation and which would exit the debicarbonation unit may be advantageously recycled to the reactive crystallization unit CZ2 50. This formed CO2 may be mixed with the CO2-containing feedgas 210 before entry into the reactive crystallization unit CZ2 50 or may be fed separately from the feedgas 210 to the reactive crystallization unit CZ2 50.

Carrying out this embodiment of the process illustrated in FIG. 3 is particularly advantageous when the sodium bicarbonate solids generated in the cooling crystallization step matches a desired size specification of the crystalline sodium bicarbonate product made in the reactive crystallization step. Sending the sodium bicarbonate solids generated in the cooling crystallization step to the separation unit in which the sodium bicarbonate solids generated in the reactive crystallization step means that all crystalline sodium bicarbonate produced by both steps in this process are separated and dried together to make a single sodium bicarbonate product matching a desired size specification.

Figure 4:
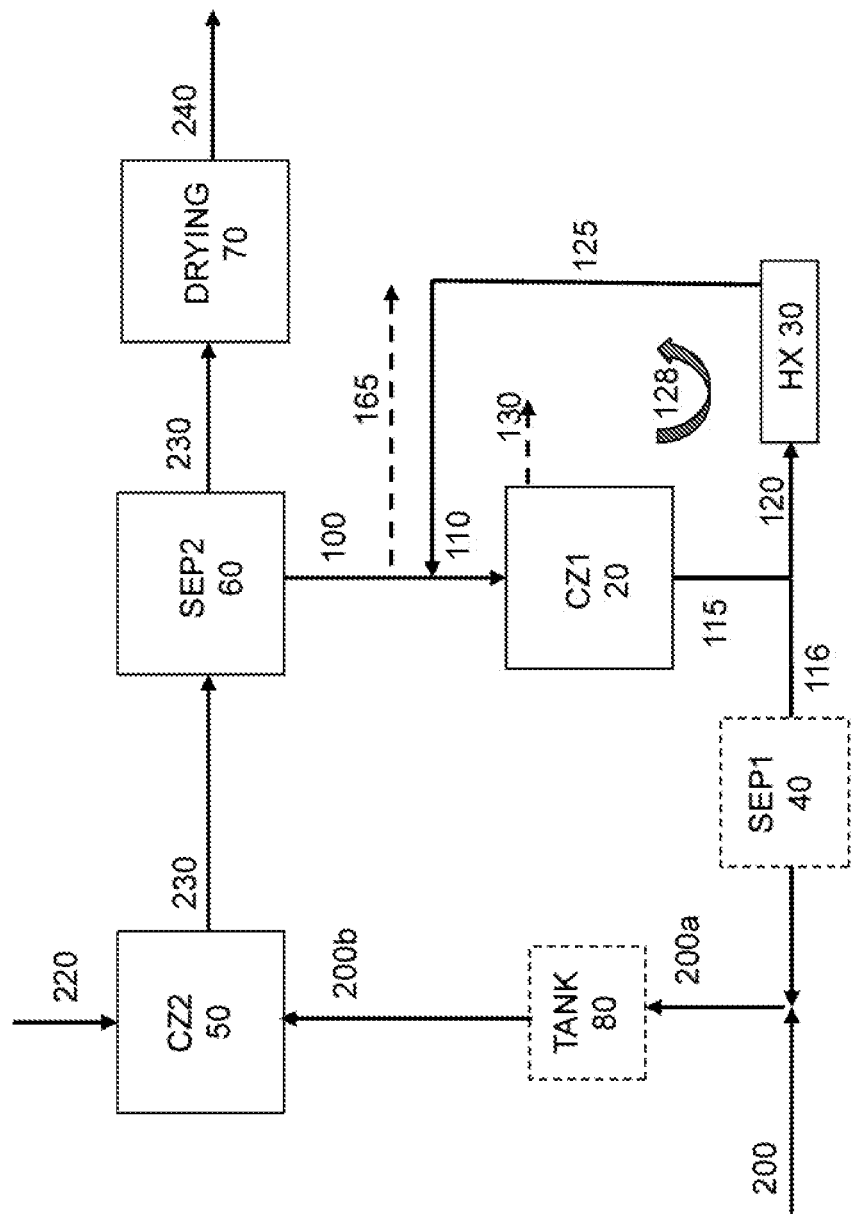
FIG. 4 illustrates a simplified process flow diagram for a sodium bicarbonate production process according to an embodiment of the present invention using sequential reactive and cooling crystallization steps, wherein a purge from the reactive crystallization step serves as a feed to the cooling crystallization step, and wherein the sodium bicarbonate crystals obtained from the cooling crystallization step are recycled at least in part to the reactive crystallization step for them to further grow in size in the reactive crystallization unit.

FIG. 4 illustrates a simplified process flow diagram for a sodium bicarbonate production process according to an embodiment of the present invention using sequential reactive and cooling crystallization steps. In the operation of FIG. 4, a purge from the reactive crystallization step serves as a feed to the cooling crystallization step, and the sodium bicarbonate crystals obtained from the cooling crystallization step are recycled at least in part to the reactive crystallization unit for the crystals to further grow in size in the reactive crystallization unit.

The system for producing sodium bicarbonate in this embodiment in FIG. 4 comprises the sodium bicarbonate cooling crystallization unit 'CZ1' 20, and the slurry cooling circulation loop 128 comprising the cooling exchanger 'HX' 30, as described previously in connection to FIG. 1. Similarly to FIG. 3, the system in FIG. 4 also comprises the sodium bicarbonate reactive crystallization unit 'CZ2' 50, the separation unit 'SEP2' 60, and the drying unit 70. The system in FIG. 4 may also comprise the separation unit 'SEP1' 40 as described previously in conjunction to FIG. 1; however the separation unit 'SEP1' 40 when used in FIG. 4 is no longer included in a slurry separation loop 118 hydraulically connected to the sodium bicarbonate reactive crystallization unit CZ1 20.

The operation of the system of FIG. 4 is carried out in the similar manner as that of, except that the portion 116 of the slurry stream 115 exiting the cooling crystallization unit 20, after being optionally enriched in solids content in the optional separation unit 40, serves as a feed to the sodium bicarbonate reactive crystallization unit CZ2 50. As shown, the portion 116 of slurry stream 115 being optionally enriched in solids may be mixed with the purge stream 200 exiting a sodium carbonate crystallization unit for the resulting mixture 200a to be fed to the reactive crystallization unit CZ2 50. An optional tank 80 may serve as a holding vessel for at least a feed stream 200b withdrawn from tank 80 to be directed to reactive crystallization unit CZ2 50.

Carrying out this embodiment of the process illustrated in FIG. 4 is particularly advantageous when the sodium bicarbonate solids generated in the cooling crystallization step is too small in size to match a desired size specification of the crystalline sodium bicarbonate product. Recycling the sodium bicarbonate solids generated in the cooling crystallization step to the reactive crystallization step would permit additional growth of these crystals before they are ultimately recovered and dried to make a sodium bicarbonate product matching the desired size specification.

Figure 5:
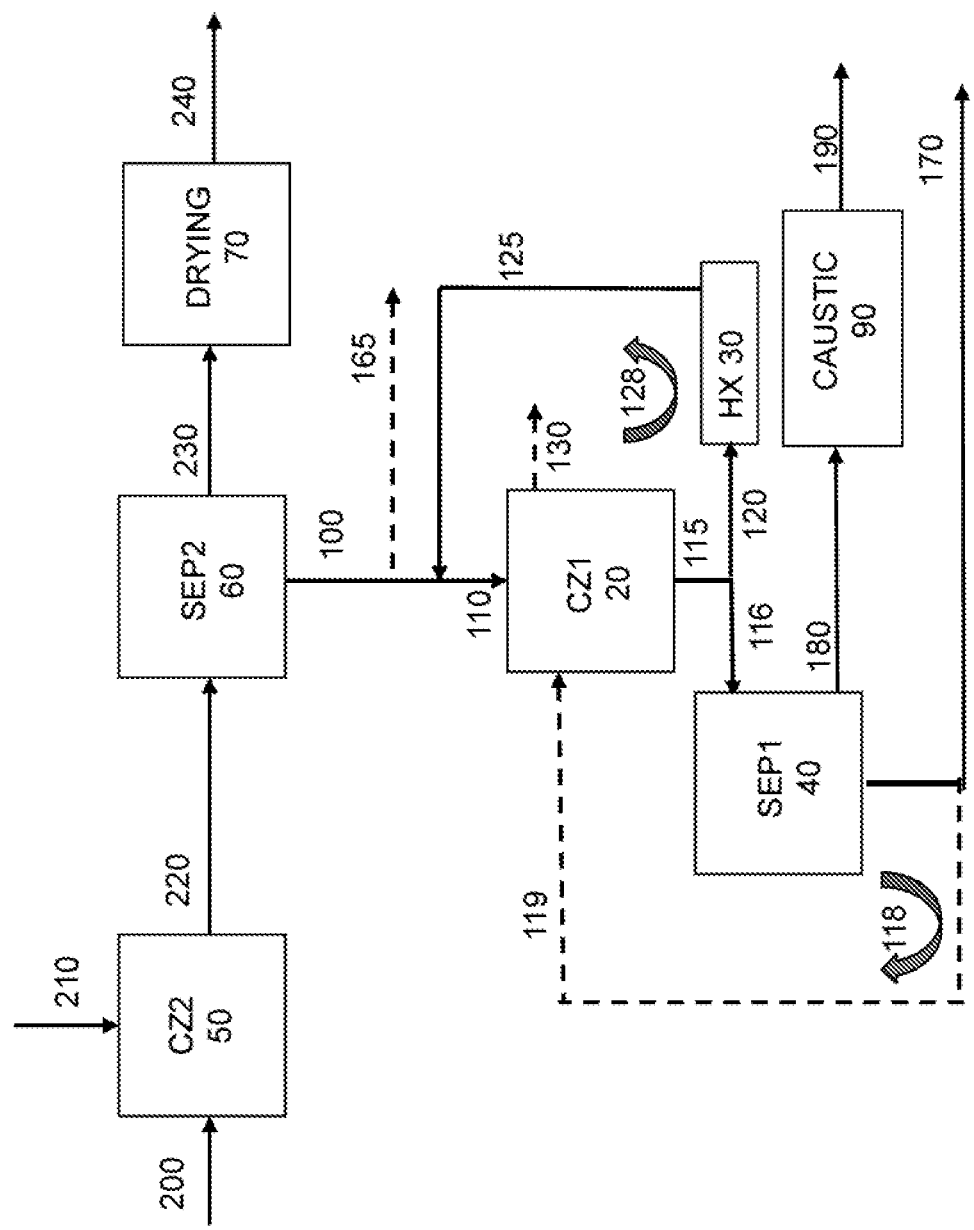
FIG. 5 illustrates a simplified process flow diagram for a sodium bicarbonate production process according to yet another embodiment of the present invention using sequential reactive and cooling crystallization steps, wherein a purge from the reactive crystallization step serves as a feed to the cooling crystallization step, and wherein the sodium bicarbonate crystals obtained from the cooling crystallization step are subjected to a caustic treatment to form sodium carbonate.

FIG. 5 illustrates a simplified process flow diagram for a sodium bicarbonate production process according to yet another embodiment of the present invention using sequential reactive and cooling crystallization steps. In the operation of FIG. 5, a purge from the reactive crystallization step serves as a feed to the cooling crystallization step, and the sodium bicarbonate crystals obtained from the cooling crystallization step are subjected to a caustic treatment to form sodium carbonate.

The system for producing sodium bicarbonate in this embodiment in FIG. 5 comprises the sodium bicarbonate cooling crystallization unit 'CZ1' 20, and the slurry cooling circulation loop 128 comprising the cooling exchanger 'HX' 30, as described previously in connection to FIG. 1. Similarly to FIG. 3, the system in FIG. 4 also comprises the sodium bicarbonate reactive crystallization unit 'CZ2' 50, the separation unit 'SEP2' 60, and the drying unit 70. The system in FIG. 4 also comprises the separation unit 'SEP1' 40 as described previously in conjunction to FIG. 1; however the separation unit 'SEP1' 40 when used in FIG. 5 may no longer be included in a slurry separation loop 118 hydraulically connected to the sodium bicarbonate reactive crystallization unit CZ1 20. The system in FIG. 5 further comprises a caustic treatment unit 90 which receives a solids stream from the separation unit 'SEP1' 40.

The operation of the system of FIG. 5 is carried out in the similar manner as that described for FIG. 3, except that the solids-enriched stream 180 exiting the separation unit 'SEP1' 40 is not sent to the separation unit 'SEP2' 60, but instead is directed to the caustic treatment unit 90 for the sodium bicarbonate to be converted to sodium carbonate, and the stream 190 exiting the caustic treatment unit 90 is enriched in sodium carbonate. A caustic additive 195 is added to the caustic treatment unit 90.

The caustic treatment in unit 90 may comprise adding a caustic additive 195 to the sodium bicarbonate crystals in the solids-enriched stream 180. The caustic additive may include a hydroxide compound. A suitable caustic additive may comprise or consist of lime, sodium hydroxide, or mixture thereof.

Carrying out this embodiment of the process illustrated in FIG. 5 is particularly advantageous when the crystalline sodium bicarbonate particles recovered from the cooling crystallization unit 20 are too small to be fed to the reactive crystallization step without negatively impacting the sodium bicarbonate size in the reactive crystallization unit 50, performing the caustic treatment on the recovered crystalline sodium bicarbonate particles from the cooling crystallization unit 20 to convert sodium bicarbonate to sodium carbonate allows recovery of this alkali value, and then return such sodium carbonate to a soda ash production process and/or to the reactive crystallization step.

Particulate Sodium Bicarbonate Product

The sodium bicarbonate production process according to the invention allows to directly produce a low-cost fairly-pure crystalline sodium bicarbonate out of one or more quite-impure purge liquors. The crystalline sodium bicarbonate however does contain within its polycrystalline structure a certain amount of impurities. Applicants have surprisingly found that the presence of such impurities in its polycrystalline structure provides at least one of the following advantages to the resulting product:
1. excellent flowability of the product in form of powder,
2. smoother particle surface (e.g., with much less spikes or long thin needled and smoother surface landscape),
3. more regular granulation into ovoid or spherical shaped particles (e.g., with very few sharp angles and/or mean axial ratio of at least 0.7, preferably approaching 0.9 to 1), and/or
4. a narrow particle size distribution.

In those advantageous embodiments, it has been observed that the produced sodium bicarbonate crystals contain much less impurities than the mother liquor. It is advantageous that the crystalline sodium bicarbonate product contains less than 1.5 g/kg $Na_2SO_4$ and/or less than 1.5 g/kg NaCl.

The crystalline sodium bicarbonate particles preferably contain less than 0.5 g/kg Si or 500 ppm Si (measured as silica).

The crystalline sodium bicarbonate particles preferably contain 500 ppm Total Organic Carbon or less.

However it has been found that the produced sodium bicarbonate product preferably contains some of these impurities within its polycrystalline structure to confer one or more specific advantageous characteristics and/or properties, as described above.

In preferred embodiments, the crystalline sodium bicarbonate product may contain more than 0.3 g/kg $Na_2SO_4$ and/or more than 0.3 g/kg NaCl. A preferred range for NaCl content is from 0.6 to 2 g NaCl per kg of total weight (or 0.06-0.2 wt %); from 0.6 to 1.2 g NaCl per kg of total weight (or 0.06-0.12 wt %) being more preferred. A preferred range for $Na_2SO_4$ content is from 0.4 to 2.2 g $Na_2SO_4$ per kg of total weight (or 0.04-0.22 wt %); from 0.4 to 1.3 g $Na_2SO_4$ per kg of total weight (or 0.04-0.13 wt %) being more preferred.

The produced sodium bicarbonate product preferably contains organic impurities within its polycrystalline structure. The sodium bicarbonate product may contain at least 75 ppm of Total Organic Carbon (TOC); preferably at least 80 ppm TOC; more preferably at least 100 ppm TOC; yet more preferably at least 110 ppm TOC; most preferably at least 120 ppm TOC. Although more than 500 ppm TOC may be present in the final product, it is preferred that the sodium bicarbonate product contains at most 500 ppm TOC; more preferably at most 400 ppm TOC. A most preferred range of total organic content inside the polycrystalline structure of the sodium bicarbonate product may be more than 100 ppm TOC and at most 350 ppm TOC, or more than 120 ppm TOC and at most 400 ppm TOC.

The sodium bicarbonate product preferably also contains some inorganic impurities within its polycrystalline structure. The sodium bicarbonate product may contain magnesium in an amount of at most 18 ppm, or at most 15 ppm, or at most 12 ppm. Values of magnesium content in the sodium bicarbonate product may be at least 1 ppm, or at least 3 ppm, or at least 4 ppm. A preferred range of Mg content inside the polycrystalline structure of the sodium bicarbonate product may be from 4 to 18 ppm Mg or from 4 to 12 ppm Mg. A Mg content in the particulate sodium bicarbonate product ranging from 7 to 18 ppm is also suitable.

The sodium bicarbonate product may contain calcium in an amount of at least 30 ppm Ca; or at least 50 ppm Ca; or at least 60 ppm Ca, or at least 70 ppm Ca. Values of calcium content in the sodium bicarbonate product may be at most 200 ppm Ca, or at most 180 ppm Ca, or at most 150 ppm Ca, or at most 125 ppm Ca, or at most 115 ppm Ca. Preferred ranges of Ca content inside the polycrystalline structure of the sodium bicarbonate product may be from 30 to 200 ppm Ca; or from 50 to 180 ppm Ca; or from 70 to 110 ppm Ca.

The sodium bicarbonate product may contain silicon in the form of silica and/or silicates in an amount of at least 100 ppm Si (measured as silica), or at least 125 ppm Si (measured as silica), or at least 150 ppm Si (measured as silica). Values of Si content inside the polycrystalline structure of the sodium bicarbonate product may be less than 500 ppm Si, or at most 450 ppm Si, or at most 425 ppm Si. A preferred range of Si content inside the polycrystalline structure of the sodium bicarbonate product may be from 125 to 400 ppm Si (measured as silica).

In preferred embodiments, the crystalline sodium bicarbonate product may contain sodium carbonate, generally in a low amount up to 2% by weight, preferably 1% or less. A typical range of sodium carbonate content in the crystalline sodium bicarbonate product may be between 0.2 and 0.7% by weight.

The sodium bicarbonate product is preferably free of a flow aid additive. For example, the sodium bicarbonate product may be free of an alkaline earth phosphorous-containing flow aid agent (such as tricalcium phosphate) and/or may be free of a silica-based flow aid agent such as hydrophobic silica, silica gel, or nanosized silica.

The sodium bicarbonate product may contain optional ingredients such as about 0.1-5 weight percent of an anti-caking agent or desiccant, based on the weight of sodium bicarbonate. Examples of anti-caking agents may be magnesium silicate, calcium silicate, a stearate, bentonite, magnesium phosphate, and the like. Examples of desiccants may be activated alumina, calcium chloride, zinc chloride, dehydrated borax, and the like. In alternate embodiments, the sodium bicarbonate product may be free of an anti-caking agent or desiccant.

In preferred embodiments, the sodium bicarbonate product does not contain another particulate inorganic compound with which it is blended. For example, the sodium bicarbonate product should not contain discrete and separate particles of silica and/or silicates in the sodium bicarbonate product. That is to say, the sodium bicarbonate product consists of a single population of particles, each particle containing more than 98% $NaHCO_3$.

Because of the presence of valuable impurities in this product though, the sodium bicarbonate particles may comprise less than 99.5% $NaHCO_3$.

The process according to the invention is particularly effective to produce a crystalline sodium bicarbonate product comprising poly-crystalline particles with a median diameter ($D_{50}$) of less than 300 microns (or of more than a US mesh size of 50). The mean diameter is preferably 275 microns or less, or 260 microns or less, or even 250 microns or less. The mean diameter may be at least 75 microns, or at least 100 microns, or at least 125 microns. The mean diameter is defined as $D_{50}$ which is the diameter such that half of the particles, in weight, have a diameter lower than the specified value. The mean diameter of the sodium bicarbonate product may be between 75 and 250 µm, preferably between 80 and 150 µm. $D_{10}$ diameters are preferably between 40 and 100 µm, whereas $D_{90}$ diameters are preferably between 175 and 500 µm. In a variant of such embodiment in which $D_X$ is the diameter value such that x percent of the particles have a diameter lower than the value. When the particles have an approximately spherical shape, the diameter is the diameter of the particle. For irregular shapes such as non spherical particles, the diameter is six times the volume of the particle divided by its outer surface (external area).

The optimum mean diameter of the particles forming the sodium bicarbonate product depends on the use for which it is intended. Accordingly, a particulate sodium bicarbonate product which is very suitable in the majority of applications in the present invention may have a mean particle diameter $D_{50}$ of between 80 and 300 microns, or between 100 and 250 microns, or between 120 and 250 microns. Suitable ranges for $D_{50}$ may be from 120 to 199 microns, or even from 200 to 250 microns.

In a variant of such embodiment in which $D_X$ is the diameter value such that x percent of the particles have a diameter lower than the value, the particulate sodium bicarbonate product may have a $D_{10}$ diameter between 25 and 100 microns, preferably between 40 and 100 nm. Additionally or alternatively, the particulate sodium bicarbonate product may have a $D_{90}$ diameter between 175 and 500 µm, preferably between 250 and 450 rm.

The produced sodium bicarbonate is preferably in the form of a particulate powder but may contain a small weight fraction of fines, that is to say, of particles of less than 45 microns, such as those passing a size of U.S. mesh size of 325 (44 microns). In particular, preferably less than 10% by weight, more preferably less than 8% by weight, most preferably less than 5% by weight of the particles in the sodium bicarbonate product have a size of less than 45 microns (e.g., passing through a US mesh size of 325). Additionally or alternatively, preferably 8% by weight or less, more preferably 6% by weight or less, most preferably 5% by weight or less of particles in the particulate sodium bicarbonate product have a size of 37 microns or less (e.g., passing through a US mesh size of 400).

The sodium bicarbonate crystals produced by the process according to the invention have a very special structure: they contain impurities at a particular, however low, level. This level is higher than that of conventional sodium bicarbonate crystals for instance produced out of commercial sodium carbonate. Those impurities are a kind of memory in the bicarbonate crystals of the composition of the mother liquor. The usefulness of those impurities has been observed, and it is suspected that some of their concentration corresponds to the level of some additives. Positive impact on storage of powders of such crystalline sodium bicarbonate product is expected. Positive impact on flowability of such crystalline sodium bicarbonate product has been observed. The crystalline particles have also a unique granulometry and/or surface property. Moreover, they are extremely advantageous for many applications, in which cost of production is a major factor.

One embodiment relates to a particulate sodium bicarbonate product with an excellent flowability which is characterized by a low angle of repose, e.g., less than 30 degrees. The angle of repose is preferably 29 degrees or less, or 28 degrees or less, or 28.5 degrees or less, or even 27.5 degrees or less.

The particulate sodium bicarbonate product may have an angle of repose of 15 or more, preferably an angle of repose of 18 or more.

Sodium bicarbonate products made according to the present invention may have an angle of repose between 19 and 27.5 degrees and a mean diameter $D_{50}$ ranging from 85 microns to 250 microns.

Another embodiment relates to a sodium bicarbonate product of new morphology in the form of ovoid or spherical particles, which differs from the known sodium bicarbonate products, in that the present sodium bicarbonate product is not formed from particles of larger size, such as by grinding and/or milling, and/or in that the present sodium bicarbonate product is not formed by removing fines and/or particles of large size, such as by sieving.

Within the framework of the invention, the ovoid or spherical particles are particles which have an essentially curved surface free from sharp edges. They generally have a rotation profile which can vary from a lens to an ideal sphere.

The ovoid or spherical particles are preferably monolithic. Monolithic particle is understood to denote a particle formed from a non-agglomerated unit block of sodium bicarbonate.

According to the present invention, the monolithic particles are advantageously crystalline. Each particle is preferably a polycrystal.

Reagent Powder and its Use in Removing Pollutants from Gas

Another aspect of the present invention concerns also a reagent powder comprising or consisting essentially of the crystalline sodium bicarbonate product according to the invention. The crystalline sodium bicarbonate product in the reagent powder is preferably obtained by the process according to the invention.

Such reagent powders are particularly suited for the removal of pollutants from gases.

Consequently, the invention concerns also the use of the sodium bicarbonate product as an alkali sorbent in the treatment of a gas containing acid gas pollutants, preferably HCl and/or $SO_x$ (sulfur oxides). The sodium bicarbonate solid particles are injected into the gas, the pollutants react with the sodium bicarbonate solid particles, and the product(s) of the reaction and the spent solids are separated from the gas.

An aspect of the invention concerns a process for treating a gas containing acid gas pollutants, preferably HCl and/or $SO_x$ (sulfur oxides) according to which a reagent powder according to the invention is injected in the gas, the pollutants react with the reagent, and the product(s) of the reaction and the spent solids are separated from the gas.

The injection is preferably taking place in a duct inside which the gas flows. The separation of the products of the reaction and spent solids can most simply be performed by filtration, using bag filters or electrostatic precipitators. In this process, it is recommended that the temperature of the gas is above 100° C., preferably above 110° C., more preferably above 120° C., most preferably above 130° C. At those temperatures, the sodium bicarbonate in the solid particles quickly decomposes into sodium carbonate having a high specific surface and thus high reactivity. The decomposition occurs within seconds upon exposure to such temperature, for example in the gas treatment duct. The sodium bicarbonate solid particles or reagent comprising them may be injected in the dry or semidry state. By 'semidry state injection' is understood to mean an injection of fine droplets of a water solution or preferably suspension of the sodium bicarbonate solid particles or reagent into a hot gas, having a temperature above 100° C. The solution or suspension evaporates immediately after its contact with the hot gas.

A suitable example for an application using such sodium bicarbonate solid particles in the purification of a gas containing hydrogen chloride (such as flue gas from the incineration of household waste) may be found in U.S. Pat. No. 6,171,567 (by Fagiolini).

Another suitable example for an application using such sodium bicarbonate product in cleaning a gas containing sulfur dioxide and nitrogen monoxide (for example, fumes generated by the combustion of sulfur-containing fossil fuels, in electricity-producing power stations) may be found in U.S. Pat. No. 5,540,902 (by De Soete).

The present invention having been generally described, the following Examples are given as particular embodiments of the invention and to demonstrate the practice and advantages thereof. It is understood that the examples are given by way of illustration and is not intended to limit the specification or the claims to follow in any manner.

EXAMPLES

Example 1

A cooling crystallization test was conducted using a baffled cooling crystallization unit as illustrated as CZ1 in FIG. 2 over a period of 3 days.

The feed to CZ1 was a purge liquor originating from a sodium bicarbonate reactive crystallization unit (like unit CZ2 50 shown in FIG. 3) which was operated as described in the US application US 2014/013135 by David Hansen et al.

The purge liquor feeding the baffled cooling crystallization unit had a Total Alkalinity (TA) content of about 13.2-15.6 weight %. The purge liquor had a sodium bicarbonate content of about 6.3-9.8 weight % and sodium carbonate content of about 6.3-9.8 weight %. The purge liquor has a specific gravity of 1.14.

A small amount of water was added to the purge liquor to dissolve the fines present in that liquor, with a flow rate representing about 0.7 volume % of the flow rate of the purge liquor. The purge liquor with the added water was fed to the baffled cooling crystallization unit CZ1.

The sodium bicarbonate crystals grew inside the baffled cooling crystallization unit and a crystals slurry was formed. Calcium (in the form of calcium chloride) was used as a crystal growth additive in the baffled cooling crystallization unit.

A portion of the crystals slurry was recirculated in a heat exchanger loop (loop 128 as shown in FIG. 3) where it was passed through a shell and tube heat exchanger (HX 30). The inlet temperature of the heat exchanger was about 23.8° C. (74.8° F.), while the outlet temperature of the heat exchanger was about 22.2° C. (72° F.). Water was used as cooling fluid in the shell of HX 30 and the water temperature was kept at about 14.4° C. (58° F.). The flow rate of the slurry in the loop was about 100 times the flow rate of the purge liquor being fed to the baffled cooling crystallization unit. The baffled cooling crystallization unit had an overflow with a flow rate equal about 95 volume % of the purge liquor feed rate. The overflow stream had about 3.9 to 7.2 wt % solids.

A portion of the crystals in the crystallization unit were withdrawn from the baffled cooling crystallization unit, separated and dried to form a dried product. The draw-off flow rate equal was about 5.7 volume % of the purge liquor feed rate. The draw-off stream had about 33-42 wt % solids.

For comparison purpose, crystals exiting a reactive crystallization unit (like CZ2 in FIG. 4) which was operated as described in the US application US 2014/013135 were also separated and dried. The characteristics of the sodium bicarbonate products respectively identified as 'CZ1 product', of the crystals from the overflow of the baffled cooling crystallization unit, and of the 'CZ2 product' are provided below in TABLE 2.

TABLE 2

|  | Cooling crystallization CZ1 product | Reactive crystallization CZ2 product | Cooling crystallization overflow crystals |
|---|---|---|---|
| TA as NaHCO3 (wt %) | 99.06 | 99.75 | 96.97 |
| NaCl (wt %) | 0.02 | 0.06 | 0.02 |
| Na2SO4 (wt %) | 0.02 | 0.04 | 0.1 |
| Water insolubles (wt %) | 0.39 | 0.13 | 2.87 |
| Ca (ppm) | 156 | 83 | * n/a |
| Mg (ppm) | 15 | 12 | * n/a |
| Fe (ppm) | 2 | 1.3 | * n/a |
| Si (ppm) | 505 | 114 | * n/a |
| Al (ppm) | 4 | 1 | * n/a |
| wt % less than 45 μm (or +350 US Mesh) | 5.8 | * n/a | 21.6 |
| D10 (μm) | 71 | 85 | 5 |
| D50 (μm) | 161 | 241 | 24 |
| D90 (μm) | 311 | 477 | 106 |

* n/a—not available

The CZ1 product produced in the cooling crystallization unit had 156 ppm Ca, or about 2 fold more Ca than the CZ2 product produced in the reactive crystallization unit. Even though more calcium was used as a crystal growth additive in the cooling crystallization unit, the CZ1 product produced in the cooling crystallization unit had a D50 of 161 μm, about 33% lower than the D50 of 241 μm of the CZ2 product produced in the reactive crystallization unit.

The production of the CZ1 product with the CZ2 product in a process which comprised the cooling crystallization unit downstream of a reactive crystallization unit resulted in increasing the yield of sodium bicarbonate production to about 17.5%, compared to a process which would contain solely the reactive crystallization unit to produce the CZ2 product.

Example 2

A cooling crystallization test was conducted using the baffled cooling crystallization unit (such as illustrated as CZ1 in FIG. 2) over a period of 3 days in a similar manner as explained for Example 1, except that the circulation volumetric flow rate in the heat exchanger loop was reduced down to be 80% compared to the one used in Example 1.

In Example 1, it was noted that about 31% of product-sized material (i.e., material of US mesh size of 325 or less; or more than 44 μm) was lost to the overflow of the baffled cooling crystallization unit. A noticeable upwelling that broke the surface of the overflow area in the baffled area was observed. It was suspected that the circulation flow was swirling back up into the settling area (area 160 in CZ1 unit in FIG. 3). To prevent this upwelling and to see if the recovery of product-sized material could be improved (meaning reducing the amount of product-sized material in the overflow), the circulation rate in the heat exchanger loop was reduced down to 80% of that used in Example 1.

At this lower circulation rate in the exchanger loop, the Reynolds number (Re) in the heat exchanger tubes decreased from 49,221 (in Example 1) to 39,377 (in this example) which kept the flow in the turbulent flow regime (Re above 10,000). The tubeside heat transfer coefficient correlated to the tubeside Re number to the 0.8 power. By lowering the tubeside heat transfer coefficient with the reduced flow rate and keeping all other thermal resistances the same, it was estimated that there would be a drop of 10% in the overall heat transfer ability.

During this test, the upwelling was not observed in the settling area of the baffled crystallization unit, indicating that reducing the recirculation flow rate helped in preventing upwelling.

A portion of the crystals slurry was recirculated in the heat exchanger loop (loop 128 as shown in FIG. 3) where it was passed through a shell and tube heat exchanger (HX 30). The inlet temperature of the heat exchanger was about 32.2° C. (89.9° F.), while the outlet temperature of the heat exchanger was about 30.4° C. (86.8° F.). Water was used as cooling fluid in the shell of HX 30 and the water temperature was kept at about 21.7° C. (71° F.).

In Example 2, it was noted that about 22.3% of product-sized material (material of US mesh size of 325 or less; or more than 44 μm) was lost to the overflow of the baffled cooling crystallization unit, much less than in Example 1.

A portion of the crystals in the baffled cooling crystallization unit were withdrawn from the baffled cooling crystallization unit, separated and dried to form a dried product. For comparison purpose, crystals exiting a reactive crystallization unit (like CZ2 in FIG. 4) which was operated as described in the US application US 2014/013135 were also separated and dried. The characteristics of the sodium bicarbonate products, respectively, identified as 'CZ1 product', of the crystals from the overflow of the baffled cooling crystallization unit, and of the 'CZ2 product' are provided below in TABLE 3.

TABLE 3

| | Cooling crystallization CZ1 product | Reactive crystallization CZ2 product | Cooling crystallization overflow crystals |
|---|---|---|---|
| TA as NaHCO3 (wt %) | 99.06 | 99.75 | 96.97 |
| NaCl (wt %) | 0.02 | 0.06 | 0.02 |
| Na2SO4 (wt %) | 0.02 | 0.04 | 0.1 |
| Water insolubles (wt %) | 0.39 | 0.13 | 2.87 |
| Ca (ppm) | 156 | 83 | * n/a |
| Mg (ppm) | 15 | 12 | * n/a |
| Fe (ppm) | 2 | 1.3 | * n/a |
| Si (ppm) | 505 | 114 | * n/a |
| Al (ppm) | 4 | 1 | * n/a |
| wt % less than 45 μm (or +350 US Mesh) | 5.8 | * n/a | 21.6 |
| D10 (μm) | 71 | 85 | 5 |
| D50 (μm) | 161 | 241 | 24 |
| D90 (μm) | 311 | 477 | 106 |

* n/a—not available

The production of the CZ1 product with the CZ2 product in a process which comprised the cooling crystallization unit downstream of a reactive crystallization unit resulted in increasing the yield of sodium bicarbonate production to about 10%, compared to a process which would contain solely the reactive crystallization unit to produce the CZ2 product.

This disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

In the present application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Any element or component recited in a list of elements or components may be omitted from such list. Further, it should be understood that elements, embodiments, and/or features of processes or methods described herein can be combined in a variety of ways without departing from the scope and disclosure of the present teaching, whether explicit or implicit herein.

A plurality of elements includes two or more elements.

The phrase 'A and/or B' refers to the following selections: element A; or element B; or combination of elements A and B (A+B). The phrase 'A and/or B' is equivalent to at least one of A and B. The phrase 'A and/or B' equates to at least one of A and B.

The phrase 'A1, A2, . . . and/or An' with n≥3 includes the following choices: any single element Ai (i=1, 2, . . . n); or any sub-combinations of from two to (n−1) elements chosen from A1, A2, . . . , An; or combination of all elements Ai (i=1, 2, ... n). For example, the phrase 'A1, A2, and/or A3' refers to the following choices: A1; A2; A3; A1+A2; A1+A3; A2+A3; or A1+A2+A3.

The use of the singular 'a' or 'one' herein includes the plural unless specifically stated otherwise.

In addition, if the term "about" or "ca." is used before a quantitative value, the present teachings also include the specific quantitative value itself, unless specifically stated otherwise. As used herein, the term "about" or "ca." refers to a +−10% variation from the nominal value unless specifically stated otherwise.

In addition, where the use of the term "about" is before a quantitative value, the present teachings also include the specific quantitative value itself, unless specifically stated otherwise. As used herein, the term "about" refers to a +−10% variation from the nominal value.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

We claim:

1. A process for producing crystalline sodium bicarbonate, comprising:
providing an aqueous sodium-bicarbonate containing liquor originating from a reactive crystallization step in which first sodium bicarbonate crystals are produced and recovered;
feeding at least a portion of said aqueous sodium-bicarbonate containing liquor to at least one cooling crystallization unit under cooling conditions to form second sodium bicarbonate crystals and to produce a crystals slurry comprising said second sodium bicarbonate crystals; and
withdrawing at least a portion of said second sodium bicarbonate crystals from said cooling crystallization unit in a crystal slurry stream for said second sodium bicarbonate crystals to be further processed, and
flowing at least a portion of the crystals slurry at a circulation rate through a cooling circulation loop in order to be cooled before being recycled to the cooling crystallization unit, said cooling circulation loop being in fluid communication with the cooling crystallization unit, with a ratio of circulation rate to feed flow rate to the cooling crystallization being from 50:1 up to 500:1.

2. The process according to claim 1, wherein the crystal slurry stream withdrawn from the cooling crystallization unit is processed in at least one of the following steps selected from the group consisting of:
passing at least a portion of the crystal slurry stream through a separation unit to recover a solids-enriched slurry or wet solids and then drying the solids;
passing at least a portion of the crystal slurry stream through a separation unit to recover a solids-enriched slurry stream to be recycled to the cooling crystallization unit;
flowing at least a portion of the crystal slurry stream through a cooling circulation loop being in fluid communication (hydraulically connected) with the cooling crystallization unit and recycling a resulting cooled crystal slurry stream directly to the cooling crystallization unit without solids enrichment in a separation unit;
passing at least a portion of the crystal slurry stream through a separation unit to recover a solids-enriched slurry stream to be fed to a reactive crystallization unit; and
feeding at least a portion of the crystal slurry stream directly to a reactive crystallization unit without solids enrichment in a separation unit.

3. The process according to claim 1, further comprising:
separating said second sodium bicarbonate crystals from said crystals slurry to recover second sodium bicarbonate crystals; and
carrying out either of the following steps:
after the separation step, drying at least a portion of recovered second sodium bicarbonate crystals and separately drying at least a portion of recovered first sodium bicarbonate crystals to make two separate sodium bicarbonate products,
or
mixing at least a portion of said second sodium bicarbonate crystals with at least a portion of said first sodium bicarbonate crystals; and drying the resulting mixture of crystals to produce a sodium bicarbonate product.

4. The process according to claim 1, wherein the step for providing an aqueous sodium-bicarbonate containing liquor originating from a reactive crystallization unit comprises:
providing a sodium carbonate bearing stream, at least a portion of which is generated by a sodium carbonate crystallization unit; and
bicarbonating the sodium carbonate bearing stream with a gas comprising $CO_2$ in a reactive crystallization unit to produce an aqueous suspension comprising said first sodium bicarbonate crystals and further to produce at least a portion of said aqueous sodium-bicarbonate containing liquor which is fed to said at least one cooling crystallization unit.

5. The process according to claim 4, further comprising adding at least a portion of second sodium bicarbonate crystals withdrawn from the cooling crystallization unit directly to the reactive crystallization unit from which said aqueous sodium-bicarbonate containing liquor originates, and/or to the portion of said sodium carbonate bearing stream which is fed to the reactive crystallization unit.

6. The process according to claim 4, further comprising adding at least one crystal modifier additive in the portion of said sodium carbonate bearing stream prior to being fed to the reactive crystallization unit or adding said at least one crystal modifier additive directly to the reactive crystallization unit.

7. The process according to claim 6, wherein the at least one crystal modifier additive comprises calcium (Ca), and wherein calcium is added to reach an amount from 30 mg to 200 mg Ca per kg of the first sodium bicarbonate crystals produced.

8. The process according to claim 4, wherein fine particles are present in said portion of said sodium carbonate bearing stream; and wherein mixing at least a portion of the second sodium bicarbonate crystals withdrawn from the cooling crystallization unit with the portion of said sodium carbonate bearing stream which is subjected to reactive crystallization forms a combined stream and results in increasing the temperature of the combined stream to dissolve said fine particles.

9. The process according to claim 1, further comprising performing at least one of the following steps selected from the group consisting of:
   adding at least one crystal modifier additive in said portion of the aqueous sodium bicarbonate-containing liquor prior to being fed to the cooling crystallization unit;
   adding at least one crystal modifier additive directly to the cooling crystallization unit; and
   adding at least one crystal modifier additive to a cooling circulation loop being in fluid communication with the cooling crystallization unit.

10. The process according to claim 1, wherein at least one crystal modifier additive is present in the crystals slurry inside the cooling crystallization unit, and wherein the at least crystal modifier additive comprises an additive selected from the group consisting of:
   an alkali metal salt;
   phosphates,
   phospholipids,
   carboxylates,
   carboxilic acids,
   anionic hexametaphosphate,
   anionic polyphosphate,
   anionic polyphosphonate,
   soy lecithin,
   citric acid,
   anionic polycarboxylate polymer,
   anionic polyacrylate polymer,
   anionic polyacrylate-polyacrylamide co-polymer,
   anionic hydrolyzed polymaleic polymers,
   anionic maleic-acrylic acids copolymers,
   anionic acrylic acid-phosphonic acid copolymers,
   sulfates,
   sulfonates,
   polysulfonates,
   amines,
   hydroysultaines,
   polycarboxylates,
   polysaccharides,
   polyethers and ether-phenols,
   alkali metal hexametaphosphate,
   sulfosuccinates,
   amidosulfonates,
   amine sulfonates, and
   any combination of two or more thereof.

11. The process according to claim 10, wherein the at least one crystal modifier additive comprises calcium (Ca), and wherein calcium is added to reach an amount from 150 mg to 500 mg Ca per kg of the second sodium bicarbonate crystals produced.

12. The process according to claim 1, wherein at least a portion of the second sodium bicarbonate crystals withdrawn from the cooling crystallization unit are directed to a reactive crystallization step in order for these crystals to grow in size.

13. The process according to claim 1, wherein the at least one cooling crystallization unit has an overflow which is lean in crystal content, and wherein at least a portion of said overflow is directed to a waste pond.

14. The process according to claim 1, wherein at least a portion of said aqueous sodium-bicarbonate containing liquor is subjected to cooling crystallization in a baffled cooling crystallization unit comprising a crystal settling zone and a crystal magma zone.

15. The process according to claim 1, wherein the cooling crystallization unit has an operating temperature ranging from 20° C. to 35° C.

16. A process for producing crystalline sodium bicarbonate, comprising:
   providing an aqueous sodium-bicarbonate containing liquor originating from a reactive crystallization step in which first sodium bicarbonate crystals are produced and recovered;
   feeding at least a portion of said aqueous sodium-bicarbonate containing liquor to at least one cooling crystallization unit under cooling conditions to form second sodium bicarbonate crystals and to produce a crystals slurry comprising said second sodium bicarbonate crystals; and
   withdrawing at least a portion of said second sodium bicarbonate crystals from said cooling crystallization unit in a crystal slurry stream for said second sodium bicarbonate crystals to be further processed;
wherein the crystal slurry stream withdrawn from the cooling crystallization unit is further processed in at least the following step:
   flowing at least a portion of the crystal slurry stream through a cooling circulation loop being in fluid communication with the cooling crystallization unit and recycling a resulting cooled crystal slurry stream directly to the cooling crystallization unit without solids enrichment in a separation unit; and
wherein the step for providing an aqueous sodium-bicarbonate containing liquor originating from a reactive crystallization unit comprises:
   providing a sodium carbonate bearing stream, at least a portion of which is generated by a sodium carbonate crystallization unit; and
   bicarbonating the sodium carbonate bearing stream with a gas comprising $CO_2$ in a reactive crystallization unit to produce an aqueous suspension comprising said first sodium bicarbonate crystals and further to produce at least a portion of said aqueous sodium-bicarbonate containing liquor which is fed to said at least one cooling crystallization unit.

17. The process according to claim 16, wherein the sodium carbonate crystallization unit is a monohydrate crystallization unit.

18. The process according to claim 16, further comprising:
   separating said second sodium bicarbonate crystals from said crystals slurry to recover second sodium bicarbonate crystals; and
carrying out either of the following steps:
   after the separation step, drying at least a portion of recovered second sodium bicarbonate crystals and separately drying at least a portion of recovered first sodium bicarbonate crystals to make two separate sodium bicarbonate products,
or
   mixing at least a portion of said second sodium bicarbonate crystals with at least a portion of said first sodium bicarbonate crystals; and drying the resulting mixture of crystals to produce a sodium bicarbonate product.

19. The process according to claim 16, further comprising performing at least one of the following steps selected from the group consisting of:

adding at least one crystal modifier additive in said portion of the aqueous sodium bicarbonate-containing liquor prior to being fed to the cooling crystallization unit;

adding at least one crystal modifier additive directly to the cooling crystallization unit; and adding at least one crystal modifier additive to a cooling circulation loop being in fluid communication with the cooling crystallization unit.

20. The process according to claim 16, wherein the at least one cooling crystallization unit has an overflow which is lean in crystal content, and wherein at least a portion of said overflow is directed to a waste pond.

* * * * *